United States Patent
Mutagi et al.

(10) Patent No.: US 11,100,922 B1
(45) Date of Patent: Aug. 24, 2021

(54) SYSTEM AND METHODS FOR TRIGGERING SEQUENCES OF OPERATIONS BASED ON VOICE COMMANDS

(71) Applicant: Amazon Technologies, Inc., Seattle, WA (US)

(72) Inventors: Rohan Mutagi, Redmond, WA (US); Vibhav Salgaonkar, Seattle, WA (US); Philip Lee, Seattle, WA (US); Bo Li, Kenmore, WA (US); Vibhu Gavini, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/716,477

(22) Filed: Sep. 26, 2017

(51) Int. Cl.
| | |
|---|---|
| *G10L 15/04* | (2013.01) |
| *G06F 40/00* | (2020.01) |
| *G10L 15/22* | (2006.01) |
| *G10L 15/18* | (2013.01) |
| *G10L 17/22* | (2013.01) |
| *H04L 12/28* | (2006.01) |
| *G10L 13/00* | (2006.01) |
| *G10L 15/14* | (2006.01) |
| *G10L 15/08* | (2006.01) |

(52) U.S. Cl.
CPC .............. *G10L 15/22* (2013.01); *G10L 13/00* (2013.01); *G10L 15/1815* (2013.01); *G10L 17/22* (2013.01); *H04L 12/2816* (2013.01); *G10L 15/14* (2013.01); *G10L 2015/088* (2013.01); *G10L 2015/223* (2013.01)

(58) Field of Classification Search
CPC ........... G06F 17/20; G06F 17/30; G10L 15/22
See application file for complete search history.

(56) References Cited

U.S. PATENT DOCUMENTS

| | | | | |
|---|---|---|---|---|
| 9,424,840 | B1* | 8/2016 | Hart | G10L 15/22 |
| 10,091,017 | B2* | 10/2018 | Landow | H04L 12/2816 |
| 10,446,144 | B2* | 10/2019 | Aggarwal | G06F 40/56 |
| 10,552,204 | B2* | 2/2020 | Ni | G06Q 10/02 |
| 2007/0180089 | A1* | 8/2007 | Fok | H04W 24/00 709/223 |
| 2010/0185445 | A1* | 7/2010 | Comerford | G10L 15/22 704/251 |
| 2012/0016678 | A1* | 1/2012 | Gruber | G06F 9/54 704/275 |

(Continued)

*Primary Examiner* — Seong-Ah A Shin
(74) *Attorney, Agent, or Firm* — Pierce Atwood LLP

(57) ABSTRACT

This disclosure is directed to systems, methods, and devices related to providing the execution of multi-operation sequences based on a trigger occurring which may be a voice-controlled utterance or execution may be based on a trigger occurring and a condition occurring. In accordance with various principles disclosed herein, multi-operation sequences may be executed based on voice-controlled commands and the identification that a trigger has occurred. The voice-controlled electronic devices can be configured to communicate with, and to directly control the operation of, a wide array of other devices. These devices can include, without limitation, outlets that can be turned ON and OFF remotely such that anything plugged into them can be controlled, turning lights ON and OFF, setting the temperature of a network accessible thermostat, etc.

20 Claims, 14 Drawing Sheets

(56) References Cited

U.S. PATENT DOCUMENTS

| | | | |
|---|---|---|---|
| 2014/0062297 A1* | 3/2014 | Bora | H05B 47/16 |
| | | | 315/34 |
| 2015/0170213 A1* | 6/2015 | O'Malley | G06Q 30/0267 |
| | | | 705/14.41 |
| 2016/0047569 A1* | 2/2016 | Fadell | G01K 1/02 |
| | | | 236/1 C |
| 2016/0103706 A1* | 4/2016 | Novaes | G06Q 10/10 |
| | | | 718/102 |
| 2016/0259308 A1* | 9/2016 | Fadell | H04W 4/80 |
| 2016/0259905 A1* | 9/2016 | Park | A61B 5/318 |
| 2016/0327921 A1* | 11/2016 | Ribbich | F24F 11/30 |
| 2017/0108235 A1* | 4/2017 | Guan | H05B 47/19 |
| 2017/0195130 A1* | 7/2017 | Landow | H04L 12/6418 |
| 2017/0202039 A1* | 7/2017 | Logue | H04W 4/38 |
| 2017/0206190 A1* | 7/2017 | Satterfield | G06F 3/0482 |
| 2017/0243224 A1* | 8/2017 | Kamal | G06Q 20/3224 |
| 2018/0004213 A1* | 1/2018 | Absmeier | G05D 1/0214 |
| 2019/0012198 A1* | 1/2019 | Ni | G06F 9/4843 |
| 2020/0092125 A1* | 3/2020 | Klein | H04L 12/2809 |

* cited by examiner

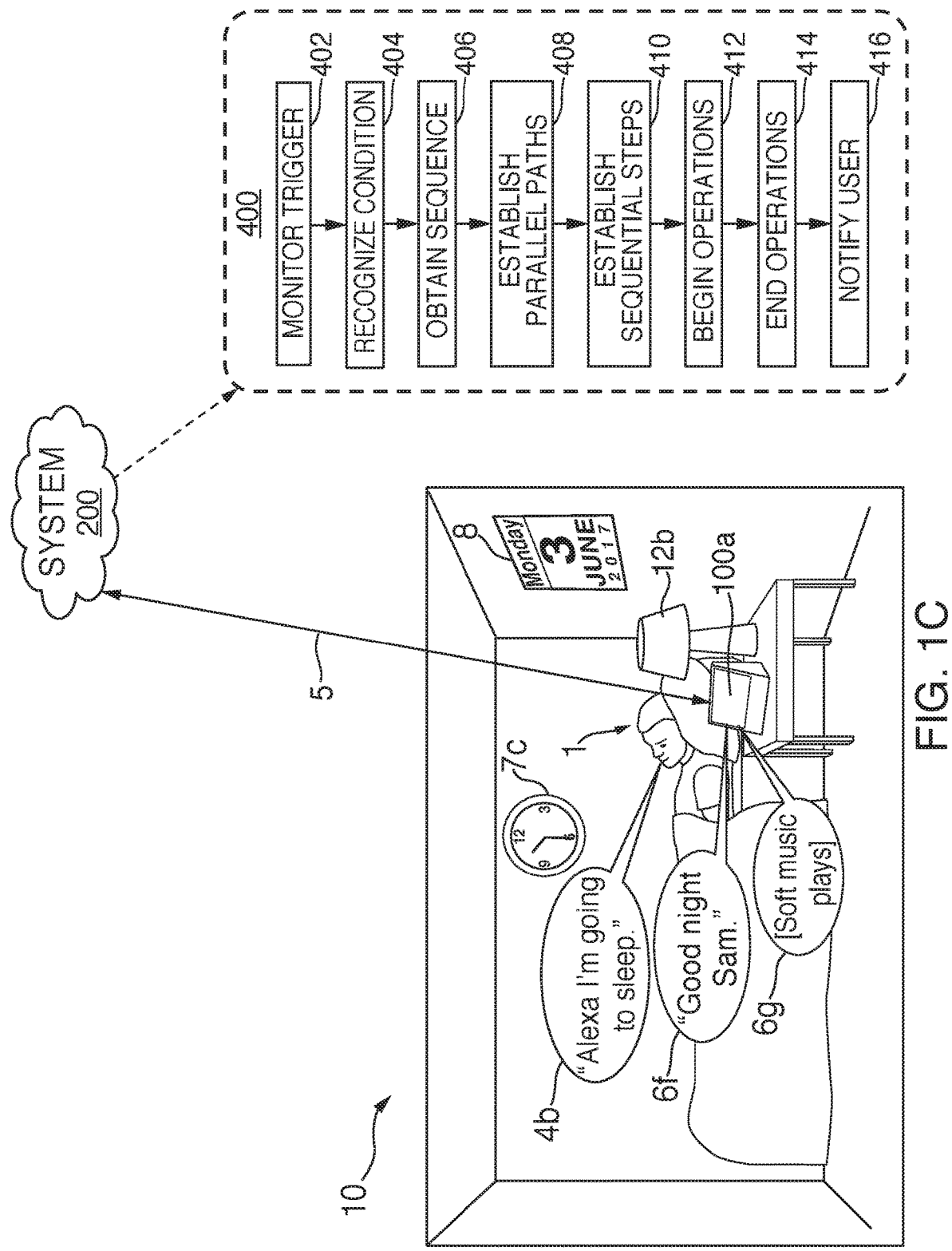

SYSTEM AND METHODS FOR TRIGGERING SEQUENCES OF OPERATIONS BASED ON VOICE COMMANDS

BACKGROUND

Electronic devices, such as audio or voice-controlled electronic devices, are capable of performing various functions. For instance, an individual may speak a command to a device and, in response, the device may perform any one of a variety of functions, such as playing a song or announcing what the weather will be. These commands and functions are typically one-off functions in which a command is issued or requested, and the responds with the execution of a single function.

BRIEF DESCRIPTION OF THE DRAWINGS

FIGS. 1A-1C are illustrative diagrams of an exemplary system for utilizing a voice-controlled electronic device to cause multi-operation sequences to be executed, in accordance with various embodiments;

DETAILED DESCRIPTION

Figure 1A:
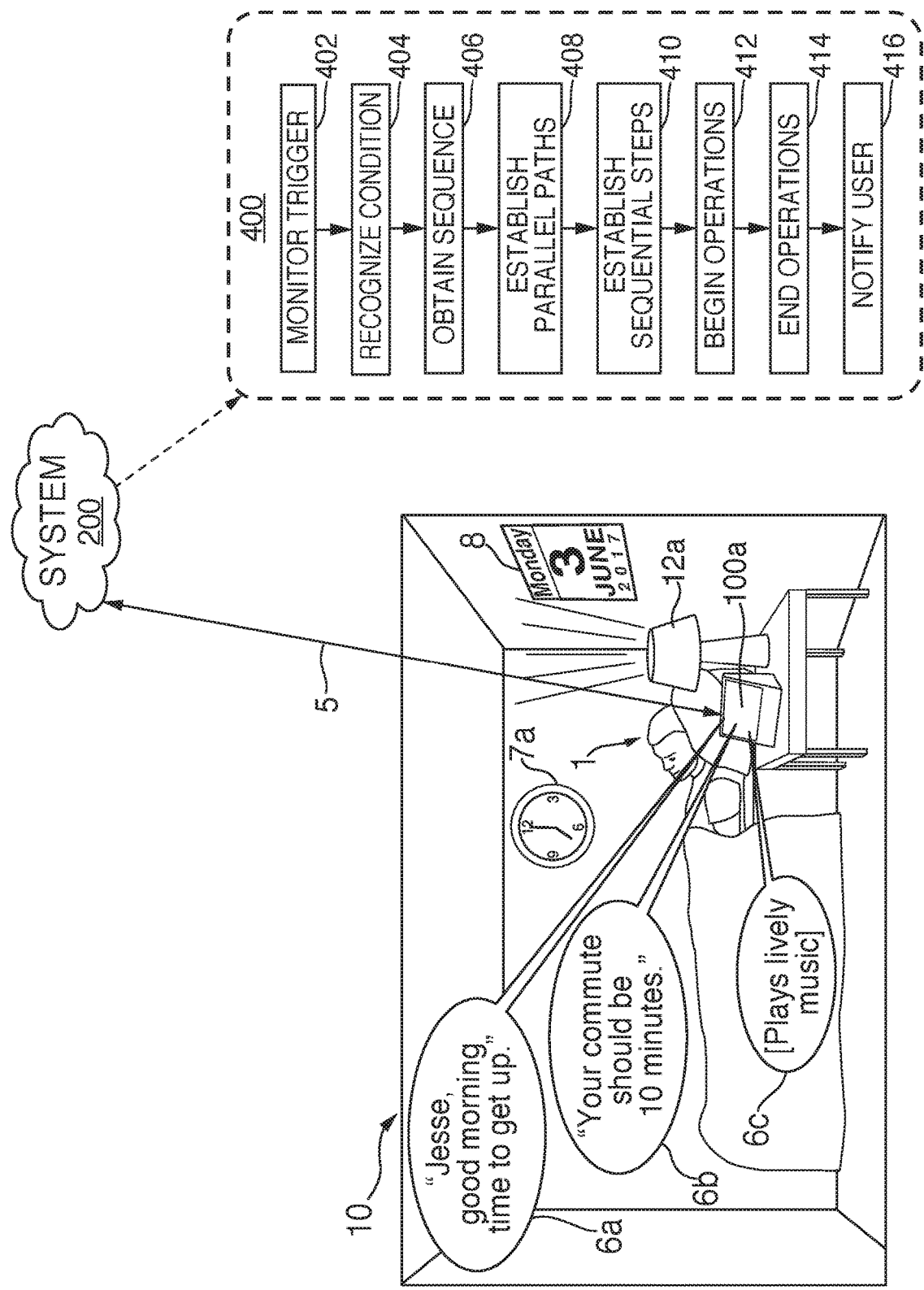

The present disclosure, as set forth below, is generally directed to various embodiments of systems, methods, and devices related to providing the execution of multi-operation sequences based on a voice-controlled trigger occurring. Devices such as Amazon's Echo and Echo Show are increasingly used by individuals for a wide variety of things, including, for example, playing music, checking the weather, finding out information, setting timers, shopping, turning lights on and off, communicating with security cameras, controlling kitchen appliances such as turning on an oven, microwave or coffee maker, detecting entry into a household via a smart door lock, etc. In these instances, a user typically states an utterance that includes a special word or sound that is often referred to as a wakeword. For example, the Echo typically is controlled through the use of the wakeword "Alexa," as in "Alexa, play music" or "Alexa, how hot is it today?" Accordingly, a user may speak an utterance and a command, such as "Alexa, play music," and the system recognizes the words spoken, determines the meaning of those words, and then, if it is capable of doing so, carries out the request. These requests typically are for the electronic device to carry out a single, direct command that is based solely on the specific request. While useful and potentially beneficial, such systems have inherent limitations on their usefulness.

The systems, methods, and devices described herein, however, may be utilized in a more robust manner that can provide an enhanced user experience. In accordance with various principles disclosed herein, and as set forth in various non-limiting embodiments disclosed herein, multi-operation sequences may be executed based on voice-controlled commands and the identification that a trigger has occurred. The voice-controlled electronic devices can be configured to communicate with, and to directly control the operation of, a wide array of other devices. These devices can include, without limitation, electrical outlets that can be turned ON and OFF remotely such that anything plugged into them can be controlled, turning lights ON and OFF, setting the temperature of a network accessible thermostat, etc. These devices can include virtually any electrical component that includes the capability to communicate over a network, such as a Wi-Fi network, to accept simple operational commands. Accordingly, the principles described in this disclosure apply to numerous embodiments such as controlling individual light bulbs (including "normal" light bulbs and color changing light bulbs), groups of lights, thermostats, kitchen appliances, smoke and carbon monoxide detectors, smart locks (which, for example, can be remotely controlled to establish a special entry pin code to permit someone to have limited entry access such as to walk a dog while the residents are on vacation), robotic vacuum cleaners and mops, window blinds and shades (for example, one could remotely open and close different sets of shades throughout the day to give the impression that a house is occupied when it is not), etc.

The creation of multi-operation sequences, requires defining at least two items: a trigger and an operation, but may also include one or more additional items, including condition(s) and other operation(s). A trigger is essentially a detectable event that the system can be on the lookout for. When detected, the system can then implement the operation(s) associated with the trigger, unless the trigger is connected to one or more conditions, in which case, those conditions would need to be satisfied in addition to the trigger occurring in order to execute the associated operation(s). For example, a trigger can be a specific utterance, such as "Alexa, good morning," which may cause a series of operations to occur each morning as part of a person's routine. A trigger can also be an input received from a smart home device, such as a smart door lock that detects someone entered the house, such as a multi-operation conditional sequence of turning various lights on, turning on specific music, and turning on the coffee maker when a smart door lock detects entry (i.e., the trigger), and a condition is met (e.g., it is after 6 pm, indicating the person coming in the front door is home from work). In some instances, a trigger can simply be an event based solely on what otherwise might be a condition, such as the time of day—for example, the trigger could be when the time is 6 am (e.g., every day at 6 am, the system starts executing a multi-operation sequence, such as playing an alarm, playing music, etc.). Thus, in order to be a "trigger,"

the event that would cause the trigger to be triggered must be an identifiable, detectable, discrete event. The systems described throughout this disclosure can compile a catalog of registered triggers which can then be compared with events that are published to the system's event bus. When a comparison results in a match between an event on the event bus and a registered trigger in the catalog, the system can begin executing the operation(s) associated with that trigger (provided any required conditions are met).

The trigger can be an utterance spoken to a voice-controlled device, such as "Alexa, I'm home" or "Alexa, I'm going to bed," or the trigger can be set through voice commands from the user, and then activated based on the detection of a user-selected event, such as a specific time of day. For example, in accordance with the principles disclosed herein, an individual can configure multi-operation sequences to be executed based on the day of the week and the time of the day, such as, a trigger occurring when the time becomes 7 am and the day of the week is a weekday (in which case, one parameter could be set as the trigger and the other as a condition, such as {trigger—7 am} {condition—is it a weekday?}, in which case the publication of an event that it is 7 am on the event bus would set the trigger, and the operations would not be executed unless the condition was met). The user may communicate with the voice-controlled to establish a series of operations that would be executed when the trigger occurs. For example, the user might state: "Alexa, at 7 am on weekdays, please play my wake-up music for five minutes, then turn on the bedroom lights and switch to my daily briefing," or the user might set up the same multi-operation sequence using, for example, a companion app that assists the user in setting the necessary information (such as setting the time of day, etc), as shown in FIGS. 3F-3N and 3P, and described below. Accordingly, each weekday at 7 am, that user would start the day with five minutes of his or her chosen wake-up music, and then at 7:05, the bedroom lights would turn ON, the music would stop, and the Echo would begin playing the individual's daily flash briefing.

Similarly, the trigger can be an utterance to the voice-controlled device, based on a multi-operation sequence created by the user (again, that can be created on a companion app running on a device such as a smart phone or tablet, or it can be created using voice commands). A user can, for example, create a trigger-based multi-operation sequence by using a companion app or by saying "Alexa, when I come home after six pm, please turn on the lights in the entry hall and kitchen and play my peaceful music for fifteen minutes, then turn off the hall lights and tell me the news of the day." From the user's perspective, it may be easier to utilize the companion app because the user would then be able to see in written/graphic form, each of the operations being selected, as well as any specific sequencing to insure that the desired multi-operation sequence is laid out as intended (e.g., to help the user organize his or her thoughts in creating the sequence). Accordingly, when the user walks in the door after 6 pm and says "Alexa, I'm home," the systems disclosed herein would cause the multi-sequence just described to be carried out, such that the selected lights would automatically be turned ON and OFF, the desired music would play for the requested amount of time, followed by the daily briefing.

The multi-operation sequences described herein, and the systems and method for establishing and executing those operations, in accordance with the principles disclosed herein, provide users with the capabilities of essentially having the voice-controlled electronic devices as essentially a personal assistant, that can be set to be at whatever level of interaction each individual user desires. The systems and methods described herein are capable of being established and executed utilizing conventional single-use operations that can be internal to the overall system, or that can be implemented using third-party resources. For example, a user could state "Alexa, tell me the score of the Seahawks game and play Celebration at 7 am the morning after any Seahawks victory." This multi-sequence command would monitor one or more third party sports new providers for information about the score of the Seattle Seahawks games. Any time the Seahawks win, the system would treat that win as the trigger, and begin executing the multi-operation sequence when the condition—7 am the next morning—is met. In this case, the first step would be to announce the score of the Seahawks game at 7 am the next morning, and the second step in the sequence would be to play the song Celebration, thereby combining first party functionality with third party functionality in a single multi-operation sequence.

The systems and methods disclosed herein to establish, and then execute multi-operation sequences in accordance with the principles disclosed herein, determine the proper sequence requirements for each given multi-operation sequence. This can include a determination of which steps must go in a sequential order, which steps can be executed in parallel, and where certain sequences must occur before parallel steps and vice versa. For example, in the wake up ritual multi-operation sequence described above, the system should examine each step of the total sequence so that any necessary ordering can be accomplished. Each individual step should be implementable essentially on its own, such that the overall system would not need to be changed each time a specific functionality changed. This would improve the reliability of the system, which should lead to users having an ever-increasing level of confidence that the system will do what it is supposed to do when it is supposed to do it, and in the order it was supposed to be done. So the system would determine that, for example, wake up music must play before anything else happens, and that the daily briefing and lights being turned on could happen in parallel (one advantage of classifying steps as parallel, is that such a classification also suggests that the order of those steps is less important (if at all), if they cannot be done exactly in parallel).

In the manner described above, and in accordance with the principles disclosed herein, each individual operation could be set forth in a template that defines all of the parameters needed to execute that operation, as well as an identification of which parameters are mandatory and which are optional. Once the parameters are defined (essentially the variables that may need to be considered), the system can determine or store the possible acceptable values for each parameter that may occur while attempting to perform the specific operation. Once the parameters and acceptable values have been established, transformation functions or instructions must be defined to convert the desired operation into an operation execution framework that can then be executed on command.

The trigger and sequence systems and methods described herein are intended to be broad, open-ended systems in which the individual components or commands are configured as essentially independent modules that provide access to and from external systems through the use of the parameters described above. In some instances, the sequences may have one or more conditions that must be met, in order to get the operation executed, even if the trigger itself occurs. For example, assuming an individual installs smart home devices in the front door, hallway lights, and living room fan, and the individual either uses the companion app to create the trigger/operation sequence or states: "Alexa, when I walk in the front door and it's after 6 pm, turn on the hallway light and the living room ceiling fan." The systems and methods described herein run through a sequence of administrative operations to establish the requested sequence.

Those administrative operations can vary depending on the mode of creation the user chooses. For example, if the companion app is utilized to set up the trigger/operation sequence, the system can immediately begin verifying each of the operational steps (to insure that they can be executed), as well as to verify that the trigger is an event that can be published to the event bus (in this regard, see FIG. 3D and the accompanying description below which describes sample workflow to set up and verify trigger/operation sequences). On the other hand, if the setup process is accomplished using voice commands, the administrative operations can include converting the spoken utterance from an analog audio signal to a digital audio signal, and transmitting that digital audio signal to the language processing system that will begin to evaluate it. That analysis begins by processing the digital audio signal using automatic speech recognition (ASR) in two ways: first, by utilizing voice ID functionality in order to try to determine who the person was who spoke. At the same time, ASR processing converts the digital audio signal into words that can then evaluated for context by a natural language understanding (NLU) subsystem. NLU processing can determine the intent of the spoken utterance, which in this case may have been to establish a multi-operation sequence. In that case, NLU processing can access a triggers and sequence subsystem that can determine the order, parameters, and values of the operation, as described above, at which point the verification process shown and described in connection with FIG. 3D applies. On the other hand, NLU processing may instead determine that the spoken utterance was intended to trigger the execution of a multi-operation sequence, in which case, NLU processing may access the portion of the triggers and sequence system that executes the multi-operation sequence when triggered.

Figure 1B:
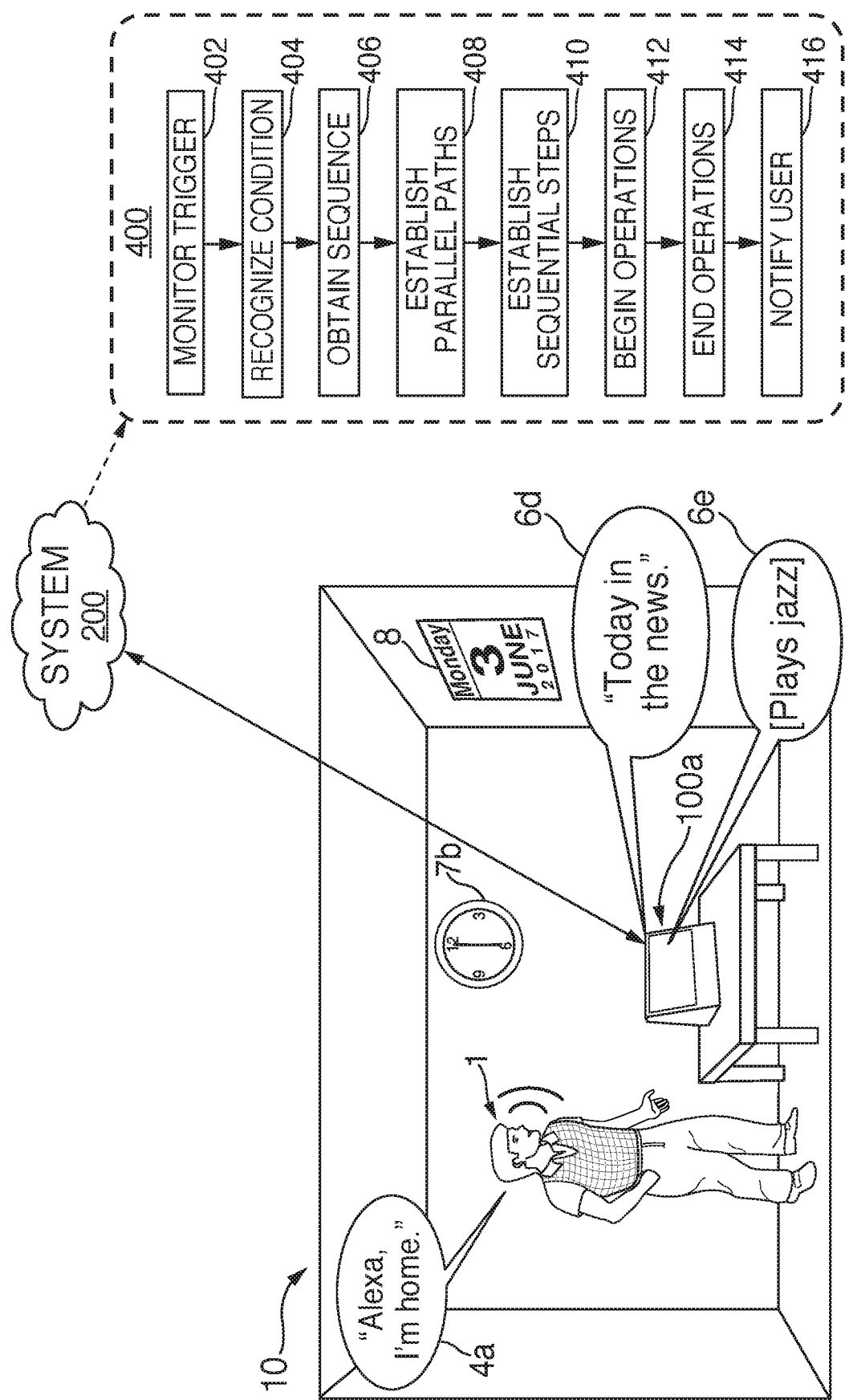

FIGS. 1A-1C are illustrative diagrams of an exemplary system for utilizing a voice-controlled electronic device to cause multi-operation sequences to be executed, in accordance with various embodiments. As shown in FIG. 1A, in a first non-limiting, illustrative embodiment, an individual 1 has already established a trigger and sequence multi-operation sequence, which has just begun to be executed. In this example, individual 1 may have spoken an utterance to voice-controlled electronic device 100a as follows: "Alexa, at 7 am, every weekday, turn on my bedroom lamp and let me know how long it will take to get to work." As shown, the time on clock 7a is 7:00 am, calendar 8 shows it is a Monday (a weekday), light is now shining from lamp 12a that was turned on once the multi-operation sequence was triggers by the time and day of the week (the necessary conditions). In addition, voice-controlled electronic device 100a has already communicated with computing system 200 via network interface 5 to obtain the commuting time. Computing system 200, and in particular a text-to-speech (TTS) module running within computing system 200, has converted the transit time into a digital audio signal, which was transmitted to device 100a through network 5. That caused device 100a to playback the audio message 6a: "Your commute time should be 10 minutes."

In addition, individual 1 could have provided additional instructions as part of the same multi-operation sequence, such as "and play my wake-up music after telling me how much time I need to get to work." In that case, once device 100a completed the step of providing commuting time information, it would move on to playing individual 1's wake-up music. In order to do so, however, device 100a needs to know who individual 1 is so that device 100a can access that user's account to obtain the appropriate wake-up music. That can be accomplished, as is described in more detail below, by accessing account subsystem 268 (see FIG. 2) through network interface 5, and extracting the appropriate information from individual 1's account.

FIG. 1A also provides an illustrative example of the principles described herein through flowchart 400 (which will be described in more detail below in connection with FIG. 4), which includes steps to identify that a trigger occurred, to determine if necessary conditions have been met, and assuming they have, to execute the appropriate operations in the appropriate order (as shown by steps 402-416).

FIG. 1B provides another illustration of the principles disclosed herein via an example of what happens when individual 1 walks in the door after work on the same day, and speaks utterance 4a: "Alexa, I'm home." Based on individual 1 setting up a second multi-operation sequence, utterance 4a eventually triggers the execution of another multi-operation sequence. In this instance, individual 1 could have established that second multi-operation sequence by stating something like: "Alexa, when I come home after 6 pm on a weekday, give me the daily news, and then play my favorite playlist." Accordingly, since the time shown on clock 7b is just after 6 pm, and the day of the week shown on calendar 8 is still Monday (a weekday), device 100a, via process 400 which is described in more detail below.

When individual 1 gets home and says utterance 4a:"Alexa, I'm home," device 100a converts the received audio signals into digital audio signals and transmits the converted signals via network connection 5 to computing system 200. Computing system 200, which includes a language processing system, applies ASR processing to the received digital audio signals, determines which words were spoken, and also determines the identity of the individual who spoke those words through voice ID processing. The ID information can be verified by accessing the user account system to check which users are associated with device 100a. Once the ID has been verified, NLU processing is performed on the words output by the ASR system within the language processing system. NLU processing determines that the spoken words are indeed a pre-set trigger for a multi-operation sequence. Accordingly, NLU processing sets in motion the specific commands that are required to fulfill the multi-operation sequence.

In particular, the NLU processing system can work with the trigger and sequence system to determine the specific parameters that were established for this particular multi-operation sequence, as well as the values those parameters are permitted to be. At that time, the specific individual commands that make up this multi-operation sequence are sequenced for execution, which then begins. As shown partially in FIG. 1B, device 100a obtains the daily news briefing via network connection 5 from computing system 200, the daily news as a series of digital audio files. Device 100a then converts those files to analog audio files and plays them on the speaker(s) located therein (or, if digital speaks are installed, no additional conversion to analog signals is required). After the daily news briefing has played, device 100*a* would continue to cause the multi-sequence to be executed by playing individual 1's favorite playlist—computing system would simply start sending digital audio files representing the songs from that playlist when it completed send daily news files, in order to complete execution of all of the steps in the multi-operation sequence.

As described briefing above, and in more detail below, computing system 200 may include a speech-processing system that, in some embodiments, is configured to determine an intent of a spoken utterance using received audio data, and to generate a response to the utterance that causes one or more operations or actions to be performed. For instance, upon receiving audio data representing utterance 4*a*, the speech-processing system may generate text data representing the audio data by performing automatic speech recognition ("ASR") processing on the audio data, and may utilize natural language understanding ("NLU") processing performed on the text data to determine an intent of the utterance. The speech-processing system may further determine that an intent of the utterance includes an intent to trigger a sequence of commands to be executed, so as described above.

FIG. 1C is an illustration of a third part of individual 1's day, bedtime. As shown in FIG. 1C, it has been a long day and individual 1 has returned to bed for the evening. The time on clock 7*c* is now 10:30 pm, and the date on calendar 8 is still Monday, Jun. 3, 2017. As shown, individual 1 states utterance 4*b*: "Alexa, I'm going to sleep." That utterance, like any other utterance, is initially processed by device 100*a* solely because device 100*a* recognized the presence of a wakeword. In response to that, device 100*a* converts the utterance to digital audio signals and transmits the digital signals via network 5 to computing system 200. Computing system 200, as described above and below, applies ASR and NLU processing to the digital audio data and ultimately determines: (1) the ID of the speaker; (2) that the intent of the utterance was to cause a multi-operation sequence to be executed; and (3) the steps necessary to execute the multi-step sequence. Computing system 200, through the triggers and sequence system, then causes each of the individual commands in that user's specific request needs to be executed, and cause them to be executed.

Here, user 1 is lying in bed, and device 100*a* causes lamp 12*b* to be turned off (such that the light emanating from lamp 12 as shown in FIG. 1A is no longer present). Device 100*a* also causes playback of a digital audio message 6C "Good night Sam," and the begins playing the soft music 6*d* selected by individual 1 for a time period specific by individual 1 when the multi-operation sequence was established. Once that time period expires, the music will stop playing, and, assuming that was the final step in the multi-operation sequence, the sound system may go into standby mode.

Each of the examples shown and described in connection with FIGS. 1A-1C is provided for purposes of illustration only, as the principles of the present disclosure can be applied to an endless combination of different multi-operation sequences, once they are established by users. For example, multi-operation sequence could include commands to begin playing a movie on a network enabled video monitor located in the same house the individual is in, but to turn off the lights in the room prior to starting the movie. That would be an example where the specific sequence that the commands are executed in is somewhat, if not critically, important. In fact, the user could define the multi-operation sequence as simply as any time the individual says "Alexa, play [MOVIE]," the computing system recognizes that not as a request to a movie domain to play a movie, but as a command to execute the multi-operation sequence by first turning off the lights, and then playing whatever movie is provided as a value for the parameter [MOVIE].

Figure 2:
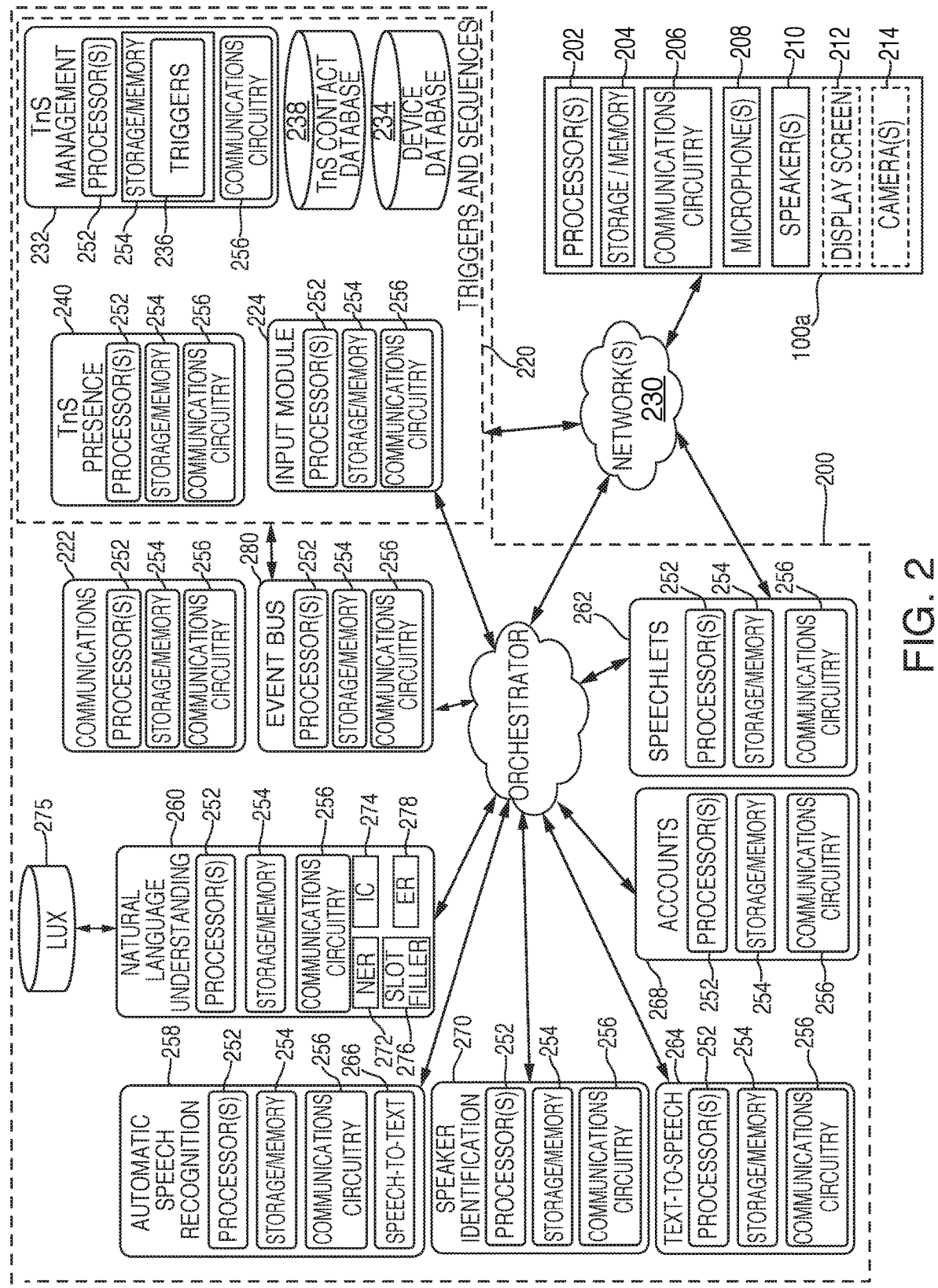
FIG. 2 is an illustrative diagram of an exemplary system architecture that can be utilized to cause multi-operation sequences to occur based on a voice command, as illustrated in FIGS. 1A-1C, for example, in accordance with various embodiments.

FIG. 2 is an illustrative diagram of the exemplary system architecture illustrated generally in FIGS. 1A-1C, in accordance with various embodiments. Electronic device 100*a* may, in some embodiments, include sound controlled functionality, such as one or more voice or sound activated components. In some embodiments, electronic device 100*a* may be configured such that it may communicate with computing system 200 in response to detecting an utterance including a wakeword, which may subsequently be followed by a request, a question, a statement, or an intent, for instance. Similarly, electronic device 100*a* may alternatively or additionally include one or more manually activated components for manually controlled functionality. In this particular scenario, electronic device 100*a* may also be configured, in some embodiments, to communicate with computing system 200, in response to a manual input being detected by one or more input mechanisms, such as a touch screen, a button, and/or a switch, for example.

In non-limiting embodiments, electronic device 100*a* may be capable of being activated in response to detecting a specific sound, such as a wakeword, as well as, or alternatively, via one or more inputs. After detecting a specific sound (e.g., a wakeword or trigger expression), electronic device 100*a* may recognize commands (e.g., audible commands, inputs, etc.) within captured audio, and may perform one or more actions in response to the received commands. Furthermore, electronic device 100*a* may also be configured to perform one or more actions in response to detecting a particular touch, or other mechanical inputs via electronic device 100*a*.

Electronic device 100*a* may correspond to any suitable type of electronic device including, but not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, electronic device 100*a* may be relatively simple or basic in structure such that no, or a minimal number of, mechanical input option(s) (e.g., keyboard, mouse, track pad) or touch input(s) (e.g., touch screen, buttons) are included. For example, electronic device 100*a* may be able to receive and output audio, and may include power, processing capabilities, storage/memory capabilities, and communication capabilities. However, in other embodiments, electronic device 100*a* may include one or more components for receiving mechanical inputs or touch inputs, such as a touch screen and/or one or more buttons.

Electronic device 100*a*, in some embodiments, may include a minimal number of input mechanisms, such as a power on/off switch such that functionality of electronic device 100*a* may solely or primarily be through audio input and audio output. For example, electronic device 100*a* may include, or be in communication with, one or more microphones that listen for a wakeword by continually monitoring local audio. In response to the wakeword being detected, electronic device 100a may establish a connection with computing system 200, send audio data to computing system 200, and await/receive a response from computing system 200. In some embodiments, however, non-voice/sound activated devices may also communicate with computing system 200 (e.g., push-to-talk devices). For example, in response to a button or touch screen being pressed, or a button or touch screen being pressed and held, a microphone associated with electronic device 100a may begin recording local audio, and may establish a connection with computing system 200, send audio data representing the captured audio to computing system 200, and await/receive a response from computing system 200.

Persons of ordinary skill in the art will recognize that although in the illustrative embodiment, computing system 200 includes various modules or subsystems that are described herein and triggers and sequence system 220, this is merely exemplary, and the modules/subsystems and triggers and sequence system 220 may be separate from computing system 200. For example, the modules or subsystems and/or triggers and sequence system 220 may be located within a dedicated computing device, which may or may not be in communication with computing system 200 and/or one or more additional devices.

Electronic device 100a may include one or more processors 202, storage/memory 224, communications circuitry 206, one or more microphones 208 or other audio input devices (e.g., transducers), one or more speakers 210 or other audio output devices, a display screen 212, and one or more cameras 214 or other image capturing components. However, one or more additional components may be included within electronic device 100a, and/or one or more components may be omitted. For example, electronic device 100a may also include a power supply or a bus connector. As still yet another example, electronic device 100a may include one or more additional input and/or output mechanisms, such as one or more buttons, or one or more switches or knobs. As another example, electronic device 100a may lack a display screen. Furthermore, while electronic device 100a may include multiple instances of one or more components, for simplicity only one of each component has been shown.

In some embodiments, electronic device 100a may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, electronic device 100a may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100a may include one or more microphone(s) 208. These microphone(s) 208 may receive audio input signals, which in turn may be sent to computing system 200 and/or speech-processing system 250 in response to a wakeword engine of electronic device 100a determining that a wakeword was uttered.

Processor(s) 202 may include any suitable processing circuitry capable of controlling operations and functionality of electronic device 100a, as well as facilitating communications between various components within electronic device 100a. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for electronic device 100a, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100a.

Storage/memory 204 may include one or more types of storage mediums such as any volatile or non-volatile memory, or any removable or non-removable memory implemented in any suitable manner to store data for electronic device 100a. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may store one or more audible and/or visual messages to be provided to electronic device 100a for indicating that a communications session is about to end if speech is not detected. For example, storage/memory 204 may store one or more audible messages and/or GUIs that include a counter that counts down from a preset time until zero, at which point the communications session may end.

In some embodiments, storage/memory 204 may include a media system, which may be configured to facilitate communications between electronic devices 100a and computing system 300. For example, the media system may store one or more communications protocols that may be executed by processor(s) 202 for facilitating communications for device 100a. In some embodiments, a sessions initiation protocol ("SIP") may be used to facilitate media transfer between electronic device 100a and one or more components of computing system 200 (e.g., triggers and sequence system 220) and another electronic device 100a. SIP, for example, is an application layer protocol that is text based, and may employ Real-time Transport Protocol ("RTP") or Secure Real-time Transport Protocol ("SRTP") functions. In particular, PJSIP (PJSIP is an open source, multimedia communications library that implements various standard-based communication protocols) communications functionality may be employed by the media system to support audio, video, presence, and messaging communications for electronic device 100a. In some embodiments, a Web Real-Time Communications ("WebRTC") protocols may be employed by electronic device 100a. In a non-limiting embodiment, the media system may include instructions that indicate which communications protocols to employ for facilitating media transfer between devices based on a device type of electronic device 100a. For example, if electronic device 100a does not include display 212 and/or camera 214, then the media system may indicate that PJSIP should be used, whereas if electronic device 100 includes display 212 and/or camera 214 then the media system may indicate that WebRTC protocols should be used.

In some embodiments, storage/memory 204 may include one or more modules and/or databases, such as a speech activity detection system, a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 310, and/or a speech-to-text ("STT") component capable of converting received audio signals into text to be sent to computing system 200 for processing.

The wakeword database may be a database stored locally by storage/memory 204 of electronic device 100a, and may include a list of current wakewords for electronic device 100a, as well as one or more previously used, or alternative, wakewords electronic device 100a. In some embodiments, an individual may set or program a wakeword for their electronic device 100a. The wakeword may be programmed directly on electronic device 100a, or a wakeword or wakewords may be set by the individual via a local client application that is in communication with computing system 200. For example, an individual may use their mobile device having the speech-processing system application running thereon to set the wakeword. The specific wakeword may then be communicated from the mobile device to computing system 200, which in turn may send/notify electronic device 100a of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100a. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100a may then begin transmitting the audio signal to computing system 200 for detecting and responds to subsequent utterances made by an individual.

Communications circuitry 206 may include any circuitry allowing or enabling one or more components of electronic device 100a to communicate with one another, one or more additional devices, servers, and/or systems. For example, communications circuitry 206 may facilitate communications between electronic device 100a and computing system 200. As an illustrative example, audio data representing an utterance (e.g., utterance 4a of FIG. 1B) may be transmitted over a network 230, such as the Internet, to computing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100a and computing system 200. In some embodiments, electronic device 100a and computing system 200 and/or one or more additional devices or systems (e.g., triggers and sequences system 220) may communicate with one another via a web browser using HTTP. Various additional communication protocols may be used to facilitate communications between electronic device 100a and computing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 100a may include an antenna to facilitate wireless communications with a network using various wireless technologies (e.g., Wi-Fi, Bluetooth, radiofrequency, etc.). In yet another embodiment, electronic device 100a may include one or more universal serial bus ("USB") ports, one or more Ethernet or broadband ports, and/or any other type of hardwire access port so that communications circuitry 306 allows electronic device 100a to communicate with one or more communications networks.

Electronic device 100a may also include one or more microphones 208 and/or transducers. Furthermore, one or more microphones located within a separate device may be in communication with electronic device 100a to capture sounds for electronic device 100a. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100a may include multiple microphones (e.g., four, seven, ten, etc.) placed at various positions about electronic device 100a to monitor/capture any audio outputted in the environment where electronic device 100a is located. The various microphones 208 may include some microphones optimized for distant sounds, while some microphones may be optimized for sounds occurring within a close range of electronic device 100a. In some embodiments, microphone(s) 208 may only begin to detect audio signals in response to a manual input to electronic device 100a. For example, a manually activated device may begin to capture audio data using microphone(s) 208 in response to a user input, such as pressing a button, tapping a touch screen, or providing any touch input gesture to a touch input component.

Electronic device 100a may include one or more speakers 210. Furthermore, electronic device 100a may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device 100a may be located. In some embodiments, speaker(s) 210 may include headphones or ear buds, which may be wirelessly wired, or hard-wired, to electronic device 100a, that may be capable of broadcasting audio directly to an individual.

In some embodiments, one or more microphones 208 may serve as input devices to receive audio inputs. Electronic device 100a, in the previously mentioned embodiment, may then also include one or more speakers 210 to output audible responses. In this manner, electronic device 100a may function solely through speech or audio, without the use or need for any input mechanisms or displays, however this is merely exemplary.

Display screen 212 may correspond to a display device and/or touch screen, which may be any size and/or shape and may be located at any portion of electronic device 100a. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100a. For instance, electronic device 100a may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100a may be configured to determine which pixels are associated with a particular location point, and which item or items are also displayed at that pixel location. Furthermore, electronic device 100a may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, it will be recognized that the aforementioned display ratios and pixel numbers are merely exemplary, and any suitable display resolution or pixel number may be employed for display screen 212, such as non-HD displays, 4K displays, and/or ultra high definition displays.

In some embodiments, electronic device 100a may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100a may include multiple cameras 214, such as one or more front-facing cameras and/or one or more rear facing cameras. Furthermore, camera(s) 214 may be configured to recognize far-field imagery (e.g., objects located at a large distance away from electronic device 100a) or near-filed imagery (e.g., objected located at a relatively small distance from electronic device 100a). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100a. For instance, camera(s) 214 may be external to, and in communication with, electronic device 100a. For example, an external camera may be capable of capturing images and/or video, which may then be provided to electronic device 100a for viewing and/or processing.

Persons of ordinary skill in the art will recognize that, in some embodiments, display screen 212 and/or camera(s) 214 may be optional for electronic device 100a. For instance, electronic device 100a may function using audio inputs and outputting audio, and therefore display screen 212 and/or camera(s) 214 may not be included. Furthermore, in some embodiments, electronic device 100a may not include display screen 212 and/or camera(s) 214, but instead may be in communication with display screen 212 and/or camera(s) 214. For example, electronic device 100a may be connected to a display screen via a Wi-Fi (e.g., 802.11 protocol) connection such that visual content sent to electronic device 100a may be sent to the display screen, and output thereby.

In one exemplary embodiment, electronic device 100a may include an additional input/output ("I/O") interface. For example, electronic device 100a may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100a may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100a. For example, one or more LED lights may be included on electronic device 100a such that, when microphone(s) 208 receives audio, the one or more LED lights become illuminated signifying that audio has been received by electronic device 100a. In some embodiments, one or more vibrating mechanisms or other haptic features may be included with electronic device 100a to provide a haptic response to an individual.

In some embodiments, electronic device 100a may include radio-frequency identification ("RFID") functionality and/or near field communication ("NFC") functionality. Furthermore, in some embodiments, electronic device 100a may include one or more infrared ("IR") sensors and one or more IR emitters. The IR sensors/emitters may be used to determine depth information. For example, in some embodiments, a distance of an individual from electronic device 100 may be determined using the one or more IR sensors/emitters. Depth determination may be performed using any depth determination technique. In some embodiments, a distance between an individual and electronic device 100a may be employed as a basis for presenting content with varying density using display screen 212. For example, when an individual is at a distance A from electronic device 100a, electronic device 100a may display weather data for a current day. However as the user moves closer to electronic device 100a, such as at a distance B from electronic device 100a, which may be less than distance A, electronic device 100a may display weather data for a current week. For instance, as the individual gets closer to electronic device 100a, the ability of the individual to see denser content increases, and as the individual moves father away from electronic device 100a, the individual's ability to see denser content decreases. This, for example, may ensure that the content displayed by electronic device 100a is continually relevant and readable by the individual.

Computing system 200, in a non-limiting, exemplary embodiment, may include various modules or subsystems that may be considered to be a speech-processing system, such as ASR module 258, NLU module 260, communications module 222, speaker ID module 270, etc. The components of the speech-processing system may be separate from, or in communication with, computing system 200 (for example, various components described herein may be implemented in one or more servers that are located in one or more physical locations, but that are configured to work together in order to appear as a single computing system, such that a user or developer would not have to specifically locate and connect to separate components, even if the components are located in different physical locations). Generally, the speech-processing system may, in some embodiments, include one or more remote devices capable of receiving and sending content from/to one or more electronic device, such as electronic device 100a. The speech-processing system may include various components and modules including, but not limited to, ASR module 258, NLU module 260, functionalities module 262, TTS module 264, and user accounts module 268. In some embodiments, the speech-processing system may also include computer readable media, including, but not limited to, flash memory, random access memory ("RAM"), and/or read-only memory ("ROM"). The speech-processing system may also include various modules that store software, hardware, logic, instructions, and/or commands for the speech-processing system, such as a speaker identification ("ID") module 270, or any other module, or any combination thereof.

ASR module 258 may be configured to recognize human speech in detected audio, such as audio captured by microphone(s) 208 which may then be transmitted to the speech-processing system. ASR module 258 may include, in some embodiments, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 258 may include an expression detector that analyzes audio signals received by the speech-processing system, such as the expression detector mentioned above with regards to electronic device 100a. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase is represented within the audio signal. The expression detector may then compare that score to a threshold value to determine whether the wakeword or phrase will be declared as having been spoken.

ASR module 258 may further attempt to match received feature vectors to language phonemes and words as known in acoustic models and language models stored within storage/memory 254 of ASR module 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR module 258 may generate results in the form of a single textual representation of the speech, an N-best list including multiple hypotheses and respective scores, and/or lattice, for example, which may be sent to NLU module 260 for processing. One example might be a conversion of text from ASR module 258 into commands for execution, either by electronic device 100a, trigger and sequence system 220, or by another device, such as a separate device or server capable of performing one or more additional functionalities thereon (e.g., a television capable of outputting video content).

NLU module 260 may be configured such that it determines user intent based on the received audio data. For example, NLU module a 260 may determine that the intent of utterance 4a in FIG. 1B is for initiating a communications session with a device, associated with a particular identifier (e.g., initiate a communications session with "Cruise"). In response to determining the intent of the utterance, NLU module 260 may communicate the received command to an appropriate subject matter server or skill on functionalities module 262 to perform one or more tasks, and/or retrieve an appropriate response or response information. NLU module 260 may include processor(s) 252, storage/memory 254, and communications circuitry 256 which, in some embodiments, may be substantially similar to processor(s) 202, storage/memory 204, and communications circuitry 206 of electronic device 100a, and the previous description may apply.

NLU module 260 may include a named entity recognition ("NER") module 272, which may be used to identify portions of text that correspond to a named entity recognizable by NLU module 260. A downstream process called named entity resolution may be configured to link a portion of text to an actual specific known entity. To perform named entity resolution, the module may utilize gazetteer information stored in an entity library storage. The gazetteer information may be used for entity resolution, for example, matching ASR results with different entities (such as song titles, contact names, device names, etc.). Gazetteers may be linked to a user account or profile in user accounts module 268, certain domains (e.g., music or shopping), TnS account database 238 of triggers and sequences system 220, and/or may be organized in a variety of other ways.

Generally, NLU module 260 takes textual input and attempts to make a semantic interpretation of the text. That is, NLU module 260 may be configured to determine a meaning of text based on the individual words so that NLU modules 260 can then respond appropriately to the meaning of those words. In some embodiments, NLU module 260 may interpret a text string to derive an intent or a desired action of the utterance (e.g., utterance 4a) as well as the pertinent pieces of information in the text that allow an action to be completed. For example, if a spoken utterance processed by ASR module 258 results in an output of text, "call Mom," NLU module 260 may determine that the intent of the utterance is to activate a telephone, or telephone functionality, and to initiate a call with a contact represented by an identifier "Mom." In some embodiments, NLU module 260 may process several textual inputs related to the same utterance. For example, if ASR module 258 outputs N text segments (as part of an N-best list), then NLU module 260 may process all N outputs.

As will be discussed further below, NLU module 260 may be configured to parse and tag-annotate text. For example, for the text "call Mom," "call" may be tagged as a command (e.g., a command to execute a phone call), and "Mom" may be tagged as a specific target of the command (e.g., user account of a messaging module or a telephone number represented by the identifier "Mom," which may be stored in a contact list and/or a device list). Further, NLU module 260 may be used to provide answer data in response to queries, for example, using knowledge/information stored within storage/memory 254 of NLU module 260 and/or storage/memory of the speech-processing system.

To correctly perform natural language understanding processing of speech input, NLU module 260 may be configured to determine a domain of an utterance. By determining the domain, NLU module 260 may narrow down which services and functionalities might be offered by an endpoint device (e.g., electronic device 100a, speech-processing system 250, triggers and sequences system 220, or any other electronic device or system/module). For example, an endpoint device may offer services relating to interactions with a telephone service (e.g., communications routing module 226), a contact list service (e.g., contact services module 228), a calendar/scheduling service, a music player service, etc. As another example, an endpoint device may enable certain services or functionalities for an individual having a user account on the speech-processing system. Words in a single text query may implicate more than one service, and some services may be functionally linked (e.g., both a telephone service and a calendar service may utilize data from the contact list).

NER module 272 may be configured to receive a query in the form of one or more results from ASR module 258. NER module 272 may then attempt to identify relevant grammars and lexical information that may be used to construe meaning of the one or more results. To do so, NER module 272 may begin by identifying potential domains that may relate to the received query. NLU module 260 may include a database of devices within storage/memory 254 of NLU module 260 that may be used to identify domains associated with specific devices. For example, electronic device 100a may be associated with domains for music, telephone functionality, calendar information, contact lists, and/or device-specific communications. In addition, NLU module 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "communications," "shopping," "music," or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular account within accounts module 268 and/or electronic device 100a. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information can help to improve entity resolution.

In some embodiments, NLU module 260 may be configured to apply the rules, models, and information applicable to each identified domain. For example, if a query potentially implicates both the communications domain and the music domain, the query may, substantially in parallel, cause the natural language understanding processing to use the grammar models and lexical information for the communications domain, as well as, to use the grammar models and lexical information for the music domain. The responses based on the queries produced by each set of models are scored, with the overall highest ranked result from all applied domains being ordinarily selected to be the correct result.

An intent classification ("IC") module 274 may parse the query to determine an intent or intents for each identified domain, where the intent corresponds to the action to be performed that is responsive to the query. Each domain is associated with a database of words linked to intents for that domain. For example, a music intent database of a music domain may link words and phrases such as "play" to a play music intent, "stop" to a stop playing music intent, and "mute" to a mute volume intent. As another example, a communications intent database of the communications domain may link words and phrases such as "call" to a call contact intent, "message" to a message contact intent, and the like. IC module 274 may be configured to identify potential intents for each domain by comparing words in the query to the words and phrases in that domain's intents database. Traditionally, the determination of an intent by IC module 274 can be performed using a set of rules or templates that are processed against the incoming text to identify a matching intent.

In order to generate a particular interpreted response, NER module 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC module 274 may be linked to domain-specific grammar frameworks having "slots" or "fields" to be filled. Each slot or field may correspond to a portion of the query text that the module believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags. As another example, if "Play 'Song 1'" is an identified intent, a grammar framework may correspond to sentence structures such as "Play {Song Title}." As yet another example, if "Call 'Bob'" is an identified intent of a communications domain, a grammar framework may correspond to a sentence structure such as "Call {Entity Name}," where the slot {Entity Name} has a value "Entity Name" associated with it.

NER module 272 may parse the query to identify words as subject, object, verb, preposition, etc., based on grammar rules and/or models, prior to resolving named entities. The identified verb may be used by IC module 274 to identify intent, which is then used by NER module 272 to identify frameworks. A framework for an intent of "play" may specify a list of slots/fields/placeholders applicable to place the identified "object" such as, for example, {Artist Name}, {Album Name}, {Song Name}, {Application Name}, {Anaphoric Term}, and any object modifier (e.g., a prepositional phrase). A framework for an intent of "call" may specify a list of slots/fields/placeholders applicable to place the identified "object" such as, for example, {Contact Name}, {Group Account Name}, {User Account Name}, {Communications Identifier}, and the like. NER module 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "Play 'Song 1' by 'Artist 1'" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 376 may determine corresponds to the "play music" intent. No determination has been made as to the meaning of "Song 1" and "Artist 1," but based on grammar rules and models, it may be determined that the text of these phrases relate to the grammatical object (i.e., entity) of the query. As another illustrative example, a query of "Call 'Contact 1'" may be parsed and tagged as {Verb}: "Call," {Object}: "Contact 1." "Call" may be identified as a verb based on a word database associated with a communications domain, which IC module 276 may determine corresponds to a "call" intent.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. Similarly, the framework for a "call" intent may attempt to resolve the identified object for {Entity Name} or {Communications Identifier}. If the search of the gazetteer does not resolve a slot/field using gazetteer information, NER module 272 may search the database of generic words associated with the particular domain. So, for instance, if the query was "play songs by 'Artist 1,'" after failing to determine an album name or song name called "songs" by "Artist 1," NER module 272 may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

The results of the natural language understanding processing may be tagged to attribute meaning to the query. So, for instance, "Play 'Song 1' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," {Intent}: "Play Music," {Artist Name}: "Artist 1," and {Media Type}: Song. Still further, "Add this to my cart" might produce a result of: {Domain} Shopping, {Intent}: "Add item to," {Anaphoric Term}: "this," and {List Type} "cart." Yet further still, "Call 'Contact 1'" might produce a result of: {Domain}: Communications, {Intent}: "Call," and {Entity Name}: "Contact 1."

The output from NLU module 260 (which may include tagged text, commands, etc.) may then be sent to an orchestrator and/or a command processor, which may be located on, or may be in communication with the other components of the speech-processing system. The destination command processor may be determined based on the output of NLU module 260. For example, if NLU module 260 outputs include a command to play music, the destination command processor may be a music playing application, such as one located on electronic device 100a or in a music playing application, configured to execute a music playing command to cause a particular audio file to output. If the output of NLU module 260, however, includes a search request, the destination command processor may include a search engine processor, such as one located on a search server, configured to execute a search command. If the output of NLU module 260 includes a request for enablement of an application's functionalities for a particular user account, then the language model for the user account may be updated to include one or more invocations, utterance frameworks, response frameworks, and values for the frameworks, for a particular application. If the output of NLU module 260 includes a request to call an entity, then the destination command processor may include a communications routing processor to initiate a communication with a particular entity's communications identifier.

In some embodiments, NLU module 260 may also include an entity resolution module 278, which allows NLU module 260 to query each domain of NLU module 260 to determine which domain or domains believe that they can handle a given request. Upon performing the query, each domain may return a "score" indicating a likelihood that they can handle the application in question. For instance, various domains may return scores of LOW, MEDIUM, or HIGH, indicating the likelihood that they can handle the particular application. Entity resolution module 278 may return application/module names or titles for the request, which may be based on relevance scores that estimate a confidence that a particular application/module may be best used for the request. As an illustrative example, if the utterance is, "Call 'Contact 1'," NLU module 260 may determine, using entity resolution module 278, which domain(s), and thus application(s)/functionality or functionalities, can likely handle this request, and may select the domain and/or application/functionality having the highest confidence score as being the domain and/or application/functionality able to handle the request. NLU module 260 may further include a slot filler module 276 that can apply rules or other instructions to standardize labels or tokens from previous stages into an intent/slot representation. The precise transformation may depend on the domain. For example, a communications domain may include a text mention of "<Entity Name> home," and use the text mentioned to resolve the target's name (e.g., "Contact 1").

Functionalities module 262 may, for example, correspond to various action specific systems or servers, sometimes referred to as "skills," capable of processing various task specific actions. Functionalities module 262 may further correspond to first party applications and/or third party applications capable of performing various tasks or actions. For example, based on the context of the audio received from electronic device 100a, the speech-processing system may use a certain functionality to generate a response, or to obtain response information, which in turn may be communicated back to electronic device 100a. For instance, an utterance may ask to communicate with another individual (and that individual may be associated with a user account represented by an identifier), and therefore functionalities module 262 may access triggers and sequences system 220 (or in some embodiments, third party messaging applications) to obtain contact information relating to user accounts and devices associated with or belonging to the user account associated with electronic device 100a. Functionalities module 262 may also include processor(s) 252, storage/memory 254, and communications circuitry 256.

In some embodiments, an application of functionalities module 262 may be written in various computer languages, such as JavaScript and Java. Various applications may include an intent schema file and a sample utterances file, such as for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java modules.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 268 may store one or more user profiles corresponding to users having a registered account on computing system 200. For example, a parent may have a registered account on computing system 200, and each of the parent's children may have their own user profile registered under the parent's registered account. In some embodiments, each user account on accounts module 268 may be associated with a particular account identifier, which may be associated with a device identifier. When a request is received by computing system 200, a device identifier may indicate the device that the request was received from. The device identifier may then be mapped to an account identifier, which may indicate an account that the requesting device is registered to. In some embodiments, accounts module 268 may store voice biometric data representing voice biometric information for a specific user account. For example, acoustic features of a particular individual's voice may be stored for that individual's user account by accounts module 268. Other information, settings, and/or preferences for each user profile may be stored within a user profile database. In some embodiments, user accounts module 268 may store a voice signal, such as voice biometric information, for a specific user profile. This may allow speaker identification techniques to be used to match a voice-to-voice biometric data associated with a specific user profile. In some embodiments, user accounts module 268 may store a device identifier associated with a particular device, a communications identifier associated with a particular user account and/or group account, any other suitable information, or any combination thereof. In some embodiments, user accounts module 268 may store a telephone number assigned to a particular user profile. User accounts module may also include processor(s) 252, storage/memory 254, and communications circuitry 256.

Additionally, in some embodiments, user accounts module 268 may store contacts associated with a particular user account and/or user profile. Further, in some embodiments, contacts stored in user accounts module may include telephone numbers (i.e., public switched telephone network ("PSTN" contacts), usernames and other information associated with third party messaging networks, and internal user accounts associated with first party messaging networks. Further still, in some embodiments, user accounts module 268 may store devices belonging to a particular user account and/or user profile.

In some embodiments, such contacts and devices may be assigned an identifier. An identifier is any data, which may be represented in text data, audio data, or any other form, that may be used to indicate a particular device, contact, or combination thereof that may be used to identify a particular entity (i.e., contact, device, and/or group). For instance, a contact having the name "Bob Kitchen" may be assigned the identifiers "Kitchen," "Kitchen, Bob," or "Bob Kitchen," among others. Similarly, in some embodiments, a device located in one's kitchen may be assigned the identifiers "Kitchen," "Kitchen Echo," or "Kitchen Echo Show," among other identifiers.

In some embodiments, user accounts module 268 may store identifiers that were assigned by a user to represent any nicknamed device that the user sees fit. For instance, a device located in the bedroom of a family member named "Aaron" may receive the identifier "Aaron," "Aaron's Room," "Aaron's Echo," "Aaron's Echo Show," "Aaron's Echo Dot," "Superstar," or any other identifier assigned by a user to represent the device.

In some embodiments, user accounts module 268 may store identifiers that were assigned to represent any group of contacts and/or devices. For instance, a user may collectively assign PSTN contacts (i.e., telephone contacts) of his or her family members the identifier "Home," "Family," or any other identifier. As another example, a user may collectively assign devices belonging to his or her user account (each of which belonging to himself/herself and/or a member of his/her family) the identifier "Home," "Family," or any other identifier. As another example, user accounts module 268 may store a combination of PSTN contacts, devices, and first party messaging contacts collectively as one identifier.

It should be recognized that although each of ASR module 258, NLU module 260, functionalities module 262, TTS module 264, and user accounts module 268 may each include instances of processor(s) 252, storage/memory 254, and communications circuitry 256, and those instances of processor(s) 252, storage/memory 254, and communications circuitry 256 within each of ASR module 258, NLU module 260, functionalities module 262, TTS module 264, and user accounts module 268 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

Computing system 200, in a non-limiting embodiment, may also include a speech activity detection system. A speech activity detection system may correspond to any device(s) or system(s) capable of performing speech activity detection techniques to received audio data in order to determine whether or not that audio data represents speech. The speech activity detection system may be configured for use in many different VAD applications including, but not limited to, speech coding, speech enhancement, speech recognition. For example, similarly to speech recognition functionality employed by ASR module 258, a speech activity detection system may determine whether a given audio signal represents speech or non-speech. In some embodiments, a speech activity detection system may employ various techniques to recognize speech with audio data including, but not limited to, spectral reduction techniques, frame dropping techniques, feature extraction techniques, and/or noise estimation techniques. Persons of ordinary skill in the art will recognize that, in some embodiments, the speech activity detection system may be included within electronic device 100a, and/or may be included within one or more additional communications system, and the inclusion of speech activity detection system within computing system 200 is merely exemplary.

Generally speaking, the problem of identifying speech within audio data becomes more difficult the noisier the input audio signal is. Therefore, subtracting the noise from the input audio signal may provide a better sense of the overall non-noise audio signal, which may then be analyzed. In some embodiments, extracting the non-noise portion of the input audio signal may be broken down into functional processes: feature extraction, classification of the input signal, and smoothing. Feature extraction, for example, looks at the input audio signal and attempts to determine portions of the input audio signal representative of known speech. This process, for instance, may function substantially similarly to keyword spotting technology, as described in greater detail above. Classification processing may correspond to a rule-based process for assigning portions of the input audio signal as being one of speech or silence. For instance, an audio input signal may be classified at various discrete intervals as being associated with speech, or silence, depending on an intensity level of the audio signal at each discrete temporal interval. If the audio input signal is greater than a predefined threshold value defining a difference between noise and non-noise, then that audio input signal may be classified as being associated with not being silence. In some embodiments, a discrete Fourier Transform ("DFT") or Fast Fourier Transform ("FFT") may be performed to the audio data. Based on a known and/or determined signal to noise ratio ("SNR"), a classification may be made as to whether or not each discrete speech coefficient corresponds to speech or non-speech. Smoothing, in some embodiments, may correspond to a process for improving/enhancing the true (e.g., non-noise) audio signal against the noise. Persons of ordinary skill in the art will recognize that the aforementioned description of a speech activity detection system is merely exemplary, and any suitable process may be employed to determine whether audio data represents speech or non-speech.

Upon receipt of audio data representing sounds, the speech activity detection system, or any other suitable component or module of computing system 200, may segment the audio data into overlapping audio frame. For example, the audio frames may have a temporal length of a few milliseconds, however persons of ordinary skill in the art will recognize that any suitable temporal length may be used. A spectral representation (e.g., an amount of energy) of the audio data associated with each of the overlapping audio frames may then be determined. In some embodiments, a FFT may be performed on the overlapping audio frames.

In some embodiments, an initial choice for a background noise threshold may be determined based on energy values previously determined. For instance, a mean energy may be used, where the mean energy is determined using the energies of each audio frame. Using the mean energy as an initial threshold may allow a reasonable classification technique in the temporal domain to be employed, where any frame having an energy greater than the mean energy would correspond to a frame include speech, and any frame having an energy less than or equal to the main energy would correspond to non-speech. In the frequency domain, a slightly different classification technique may be employed, where various frequency bands are selected, and the energy of each audio frame is binned into one of the frequency bands. A given audio frame may be said to correspond to speech if the lowest frequency band is active and two out of the remaining frequency bands are also active. However, as mentioned previously, persons of ordinary skill in the art will recognize that the aforementioned speech analysis techniques are merely exemplary, and any suitable technique, or combination of techniques, may be employed.

Computing system 200, in a non-limiting embodiment, may also include a presence tracking system. The presence tracking system may be configured to determine human presence proximate to an electronic device, such as electronic device 100a. In some embodiments, the presence tracking system may receive image data from electronic device 100a at various times, and based on that image data, determine whether the an individual, or a portion of an individual, is located with view of camera(s) 214. However, in other embodiments, the presence tracking system may receive presence information from electronic device 100a, and may store this presence information and/or provide the presence information to one or more additional systems or devices. For example, electronic device 100a may employ various image recognition techniques, such as focus sweeps, motion vectors, edge detection, flash exposure, idle image comparisons, and/or skin tone identification, to attempt to identify whether camera(s) 214 includes a portion of a human, such as a human body part (e.g., face, eyes, mouth, torso, etc.). If so, this may indicate that an individual is located nearby electronic device 100a. This information, referred to generally as "presence information," may then be sent to the presence tracking system. In this way, the presence tracking system may continually track and monitor whether any individuals are located proximate to electronic device 100a.

However, persons of ordinary skill in the art will recognize that additional techniques may be employed by electronic device 100a (as well as, or alternatively, one or more additional devices), in order to determine whether presence is detected for electronic device 100a. For example, recent activity with electronic device 100a may be used to indicate that an individual is nearby electronic device 100a. In this particular scenario, an individual that is currently, or has recently been, interacting with electronic device 100a may indicate that that individual is still located substantially near electronic device 100a. As another example, IR emitters/sensors may be employed to determine a distance away from electronic device 100 that an individual currently is. As still yet another example, received signal strength indication ("RSSI") levels may be employed to determine an approximate signal strength between a mobile device and electronic device 100a. Using the RSSI levels, presence information indicating presence, or an absence of presence, for electronic device 100a, may be determined. In some embodiments, presence data indicating presence information may be provided to computing system 200, such as to a presence tracking system.

A speaker identification system, in some embodiments, may correspond to any suitable device/system capable of identifying a particular person's voice from an audio signal. A speaker identification system may determine whether a current voice being used to speak matches known voice biometric data associated with a particular individual's voice. In some embodiments, voice biometric data may be stored within user accounts module 268 for various individuals having a user profile stored thereby. For example, individual 1 may have a user account on computing system 200 (e.g., stored within user accounts module 268), which may be associated with electronic device 100a. Stored within the user account may be voice biometric data associated with a voice of individual 1. Therefore, when an utterance, such as utterance 4a, is detected by electronic device 100a, and subsequently when audio data representing that utterance is received by computing system 200, the speaker identification system may determine whether the voice used to speak utterance 4a matches to at least a predefined confidence threshold the stored voice biometric information associated with individual 1 stored by their user account. If so, then this may indicate that individual 1 is the likely speaker of utterance 4a.

In some embodiments, the speaker identification module may receive audio data representing an utterance, or a copy of the audio data, at a substantially same time as ASR module 258. The audio data may be divided into audio frames representing time intervals, with which a number of values or features representing qualities of the audio data may be determined, along with a set of those values (e.g., feature vectors or audio feature vectors) representing features/qualities of the audio data for each audio frame. For example, each audio frame may include 25 ms of audio, and the frames may start at 10 ms intervals. This may result in a sliding window where adjacent audio frames include 15 ms of overlapping audio. Persons of ordinary skill in the art will recognize that many different acoustic features may be determined, and each feature may be representative of a particular quality of the audio data. Some exemplary approaches that may be used to process the received audio data may include, but art not limited to, mel-frequency cepstral coefficients ("MFCCs"), perceptual linear predictive ("PLP") techniques, neural network feature vector techniques, linear discriminant analysis, and semi-tied covariance matrices. The speaker identification module may also include a scoring component that determines respective confidence scores indicating how likely it is that an input utterance was spoken by a particular user.

When audio data is received by computing system 200, ASR module 258, the speaker identification module, and/or any other suitable component of the speech-processing system, may perform windowing functions to the audio data to generate framed audio data. The size of each audio frame may depend on a particular configuration of the speech-processing system, and persons of ordinary skill in the art will recognize that any audio frame size may be used. For example, as mentioned previously, each audio frame may include 25 milliseconds of audio data, and may overlap with 10 milliseconds of a next audio frame, resulting in a sliding window. Performing a windowing function may include multiplying a time record by a finite-length window with an amplitude that varies smoothly and gradually toward zero at its edges. By performing windowing, endpoints of the waveforms of respective audio frames of audio data meet, resulting in a continuous waveform without sharp transitions. A fast Fourier transform ("FFT") may be performed to convert the waveforms in each audio frame of the framed audio data from its original domain (e.g., time) to a representation in a frequency domain (thereby creating frequency domain framed audio data). Audio processing techniques other than or in addition to FFT may be used to transform audio data (e.g., waveforms) into data that can be processed as needed.

In some embodiments, user recognition feature extraction may be performed on the frequency domain framed audio data. User recognition feature extraction may include performing frame level feature extraction and/or utterance level feature extraction. The frame level feature extraction may determine which frame of a universal background model ("UBM") the frame corresponds to. The UBM may be a Gaussian mixture model, a deep neural network, etc. The utterance level feature extraction may analyze aligned speech frames to derive feature vectors of fixed length (i.e., the user recognition feature/vector data). The feature extraction may continue until voice activity is no longer detected in the input audio data, at which point an endpoint of the speech may be identified and speech processing may end. Feature extraction may, in some embodiments, be performed on all the audio data received from the electronic device 100a. Alternatively, feature extraction may only be performed on audio data including speech. Feature extraction and user recognition feature extraction may include determining values (i.e., features) representing qualities of the frequency domain framed audio data, along with quantitating those features into values (i.e., acoustic feature vectors or audio feature vectors). Feature extraction may determine automatic speech recognition feature/vector data, which may assist with speech recognition processing for ASR module 258, and user recognition feature extraction may determine user recognition feature/vector data, which may assist with speaker identification/user recognition for the speaker identification module. The feature/vector data and the user recognition feature/vector data may include the same features/vectors, different features/vectors, or may include some overlapping features/vectors. A number of approaches may be used to extract features/vectors from the frequency domain framed audio data, such as MFCCs, PLP techniques, neural network feature vector techniques, linear discriminant analysis, semi-tied covariance matrices, and persons of ordinary skill in the art will recognize that any other suitable approach may be employed.

The speaker identification module may perform speaker identification using various data including user recognition features/vector data, and training data that may correspond to sample audio data corresponding to known users associated with a particular device (e.g., electronic device 100a). The speaker identification module may generate confidence scores indicating a likelihood that a particular utterance was spoken by one of the users associated with a particular device, and may determine whether any of these confidence scores is greater than a predefined confidence score threshold. If so, then that may indicate a likelihood that a certain user is the speaker of the utterance. If two or more confidence scores are determined to be in excess of the confidence score threshold, then the speaker identification module may select the user having the greater confidence score, or may prompt the device to obtain additional information to resolve the speaker's identity.

In some embodiments, training data may be obtained and stored by user accounts module 268. The training data may be stored as waveforms and/or corresponding features/vectors, and may correspond to data from various audio samples, each audio sample associated with a known user and/or user identity. For example, each user known to the module may be associated with some set of training data for the known user. The speaker identification module may then use the training data to compare against incoming audio data (represented by user recognition feature/vector data) to determine an identity of a user speaking an utterance. The training data may be associated with multiple users of multiple devices and therefore may be associated with both a user that spoke the respective utterance, as well as electronic device 100a, which provided the audio data representing the spoken utterance.

The training data for a particular user may include a feature vector of the same size as a vector of the user recognition feature/vector data. Thus, for example, if a feature vector is of size F, the training data may also be a feature vector of size F. To create such a training data feature vector, during a training period computing system 200 may either prompt a user to speak sample audio data or may identify sample audio data known to have been spoken by a particular user. The module may then process the sample audio data to create sample training data (e.g., a feature vector of size F). The training data may then be stored by user accounts module 368 and saved for use during runtime user verification processing.

In some embodiments, speaker identification processing may further include various additional techniques to determine a speaker of an utterance. For example, device beaconing may indicate a likelihood that a particular individual's device is located proximate to electronic device 100a. In this particular scenario, if an individual's device is determined to be substantially close to electronic device 100a at a time when the wakeword is uttered, then this may indicate that the wakeword was likely spoken by that individual. As another example, historical rules may be employed to determine a speaker of an utterance. For example, one particular individual may typically interact with electronic device 100a, and therefore it may be more likely that when a wakeword is detected by electronic device 100a, that wakeword is more likely than not spoken by that particular individual. Still further, certain individuals may be interact with electronic device 100a during certain times, or to perform certain functions. For example, a particular individual may typically ask for a weather forecast using electronic device 100a during a particular time frame (e.g., between 8 and 9 o'clock). In this particular scenario, if the wakeword is determined to have been uttered during that time frame, then this may indicate that there is a high likelihood that a speaker of the wakeword (and the corresponding utterance) is that individual. As another example, if a particular individual has just performed a specific function, such as sending a message to another individual, then if the wakeword is detected by electronic device 100a temporally after, and within a certain amount of time of, the specific function, then this may indicate that that individual likely spoke the corresponding utterance. Persons of ordinary skill in the art will recognize that various additional techniques may be employed to determine a speaker of an utterance, and the aforementioned are merely exemplary. The speaker identification module may also include processor(s) 252, storage/memory 254, and communications circuitry 256.

Computing system 200 may also include, in non-limiting embodiments, a triggers and sequences system 220, which may be configured to facilitate the establishment and execution of multi-operation sequences. For example, triggers and sequences system 220 may be capable of establishing multi-operation sequences based on voice commands individual 1 provides to electronic device 100a, for example, as illustrated in FIGS. 1A-1C. Upon the speech-processing system determining that an intent of an utterance is to execute a multi-operation sequence, computing device 200 may access triggers and sequences system 220 to facilitate the execution of the individual commands that make up the multi-operation sequence.

Triggers and sequences system 220, in some embodiments, may include a triggers and sequences (TnS) management module 232, which may include: processor(s) 252, storage/memory 254 (which may itself store triggers 236), communications circuitry 256, TnS contact database 238, and device database 234. These components can store established multi-operation sequences, and can provide support and interfaces to enable computing system 200, and in particular, the language processing system, to utilize and create multi-operation sequences, such that when a trigger occurs and the appropriate conditions are met, each of the individual commands are appropriately executed, such that the multi-operation sequence is successfully completed. Triggers and sequences system 220 can also include TnS presence module 240 (which may itself include processor(s) 252, storage/memory 254, and communications circuitry 256), as well as input module 224 (which similarly may itself include processor(s) 252, storage/memory 254, and communications circuitry 256). Further details of triggers and sequences system 220 are shown in FIGS. 3A-3E, and described in more detail below.

Computing system 200 may also include a separate communications routing module 222 that may employ VoIP functionality to facilitate audio, video, and/or text data communications between the initiating device and the recipient device. In some embodiments, the communications routing module may allow a communications session to be established between an initiating device and a recipient device using one or more VoIP protocols including, but not limited to SIP, RTP, RTCP, SRTP, and SDP. In one illustrative embodiment, a SIP signaling command may be provided to the communications routing module for communicating with the recipient device. In particular, PJSIP functionality adds a new "user-to-user" header that indicates the device pair for the communications session. As an illustrative example, the communications routing module may route communications to a device's communications identifier in response to receiving an instruction to establish a communications session between one communications identifier and another.

The communications system may, in some embodiments, include a contact services module that can store contact lists, contact information, and the like, associated with one or more communications identifiers. For example, if electronic device 100*a* is registered to an account identifier associated with electronic device 100*a*, and in particular to individual 1 who is a registered user of electronic device 100*a*, then a contact list associated with individual 1 may be accessible from the contact services module based on a communications identifier associated with the account identifier. In some embodiments, two or more communications identifiers may be linked together such that their contact lists may both be used to populate another contact list, such as a group account's contact list. For example, if two user accounts, corresponding to two separate users, are both associated with a same group account, then contact lists for each of the two user accounts may form the group account's contact list, which may then be associated with the account identifier. The communications system may, as an illustrative example, store contact information associated with each contact entry of a communications identifier's corresponding contact list. For example, a contact list associated with a particular communications identifier may indicate contact identifiers for each contact of that contact list. For each contact identifier, contact information, such as, but not limited to, contact names, communications identifiers, device identifiers (indicating devices registered to the contact's user account(s)), additional contacts, group accounts, telephone numbers, location information, presence information, and the like, may be stored within a corresponding storage/memory 254. The contact services module may also include processor(s) 252, storage/memory 254, and communications circuitry 256.

Computing system 200, which has been described generally as modules and/or subsystems in communication with each other, may be implemented with processor(s) that coordinate the communications, data transfer, instructions, etc., which may be referred to as the orchestrator. For example, one product generated by ASR module 258 is text data generated from audio data received from, for example, a voice-activated device. The orchestrator could receive the text data and transfer the text data to NLU 260 for further processing, or, alternatively, could provide the instructions and timing for ASR 258 to deliver the output text data directly to NLU 260. Similarly, the orchestrator could perform the same functions between NLU 260 and text-to-speech module 264 when NLU 260 has prepared responsive instructions or output data for transfer to the voice-activated device, which can play the output data as audio signals on speakers therein. Computing system 200 also may include catalog Lux 275, which may, for example, store and index custom-utterances for use by NLU 260, and specifically by NER processing 272 described above. This can be accomplished to increase the speed with which intent-resolution may be accomplished, thereby reducing inherent latencies that may otherwise occur.

Computing system 200 also includes event bus 280, which may itself include processor(s) 250, storage/memory 254, and communications 256. Event bus 280 provides computing system 200 with the capability for various components to publish to and subscribe to receive events that may be particularly relevant to one or more modules. For example, as described throughout this disclosure, events may occur that triggers and sequences system 220 may use for comparison in order to determine whether a trigger has occurred, such as when an individual says an utterance "Alexa, good morning." Once the utterance has gone from audio signals, to audio data, to text data (as described above), and NLU 260 determines that the intent of the utterance is a trigger/operation. In that case, the orchestrator could cause NLU 260 to publish the event on event bus 280. Triggers and sequences 220, which includes a direct connection to event bus 280, could subscribe to event bus 280 which would enable it to view events published on event bus 280 (a more complete description of how triggers and sequences 220 can address potential trigger events is shown in FIG. 3E and described below).

Figure 3A:
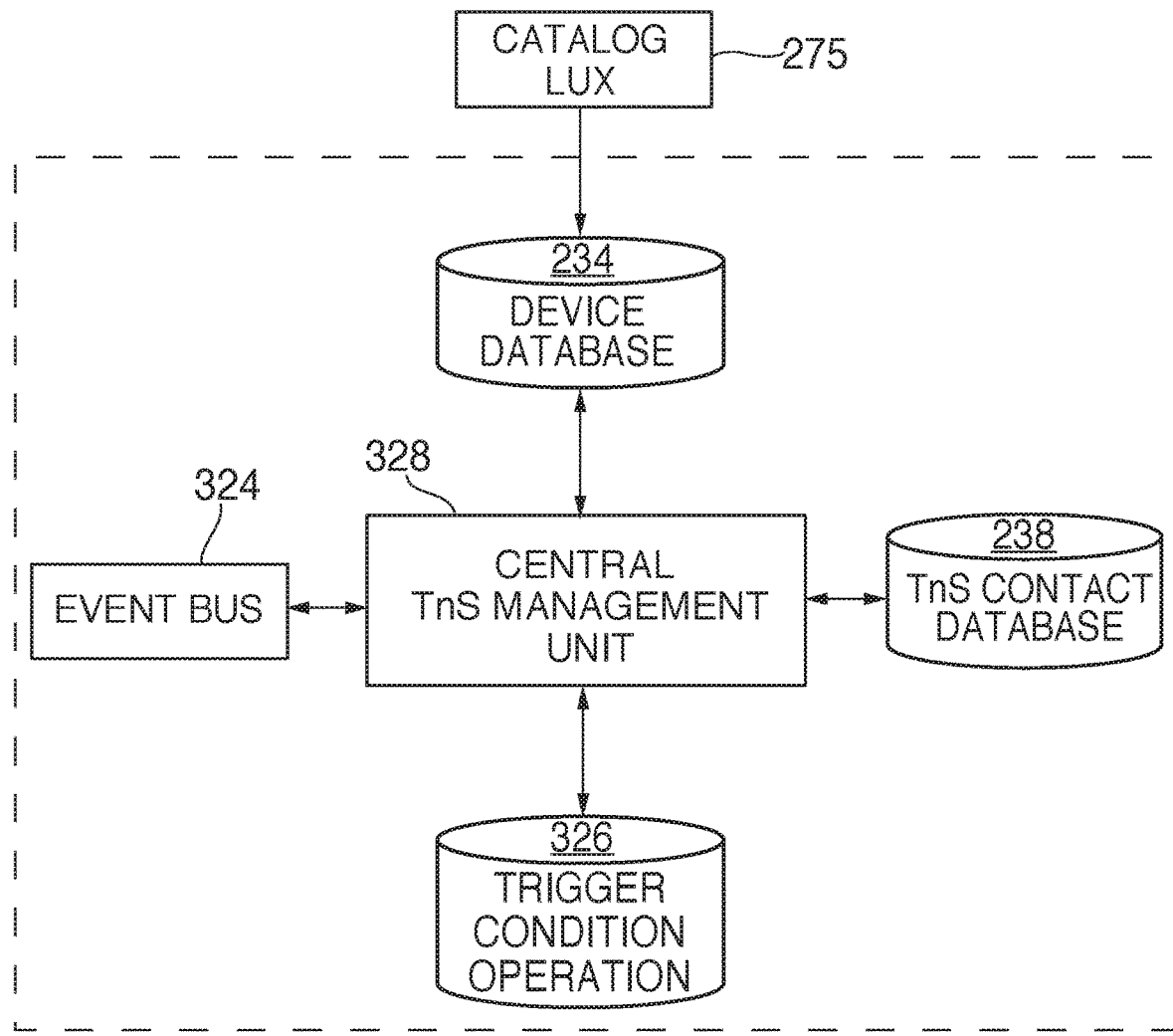
FIGS. 3A and 3B are an illustrative system schematics of portions of a trigger and sequence operation system for executing multi-operation sequences based on a voice command, in accordance with various embodiments.
Figure 3B:
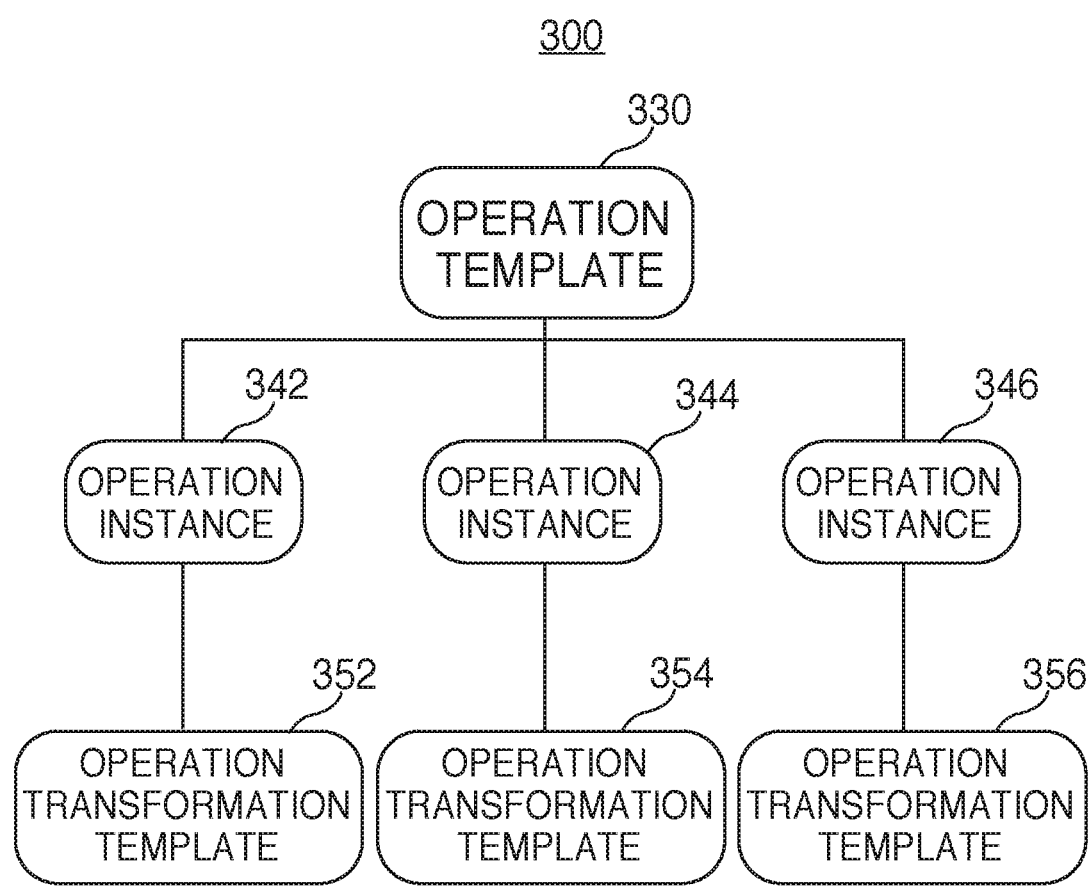

FIGS. 3A and 3B are an illustrative system schematics of portions of a trigger and sequence operation system for executing multi-operation sequences based on voice commands, in accordance with various embodiments. FIG. 3A shows central Triggers and Sequences (TnS) management unit 328, which is in communication with device database 234 (from computing system 200), the speech processing system, TnS contact database 238, trigger condition operation database 326, and event bus 280 (which, as described above, triggers and sequences system 220 subscribes to receive events from, and subscribes to publish to). Each of these components may be combined with other components, or may be broken down into smaller components that operate to perform the described functions, without departing from the principles disclosed herein. In general, all of the components shown in FIG. 3A, whether they are standalone components, or integrated with other components within computing system 300, collectively provide two primary functions: (1) to take data representing voice commands from users to establish multi-operation sequences and create and store those operations, such that the triggers, conditions, and operations may be easily and quickly accessed and review; and (2) to manage inputs from language processing system that a specific trigger or condition may be invokes, and if so, to begin the execution of the individual commands that makes up the corresponding multi-operation sequence.

For example, when a new multi-operation sequence is established by individual 1 (which process itself is described in more detail below with respect to FIG. 3D), who regularly utilizes device 100*a*, central TnS management unit 328 communicates with device database 234 and TnS contact database 238 to associate the new operation with individual 1 and device 100a. At the same time, the trigger and condition (if appropriate) may be stored in trigger condition database 326 for monitoring—to quickly identify any situation in which a trigger and or trigger/condition combination is satisfied, thereby indicating that the multi-operation sequence should be executed. Once the trigger or trigger/combination is satisfied, TnS management unit 328 can format instructions to execute the individual commands within the operation, and provide those instructions to operation execution module 324.

FIG. 3B illustrates, in particular, the data structures and processes 300 that may be utilized in the establishment and execution of multi-operation sequences in accordance with principles disclosed here. For example, each multi-operation sequence starts with an operation template 330 that essentially describes the operation that a dependency system can perform. The operation template should include all of the parameters that are mandatory and/or optional for performing the given operation. The next layer includes a series of one or more operation instances, in this example there are three such instances 342, 344, and 346, which maps from the operation template, and encapsulates all of the possible values each of the parameters from the template can reasonably be while performing the operation. The layer below the instance layer is the transformation layer, which includes a second series of one or more templates that map from the instances to describe a way to transform the parameters, values, and instructions from the operation template and instance into a specific execution framework that can be executed by computing system 200. Put another way, the operation template describes the particular command in terms of parameters, the operation instance sets forth the relevant values the parameters can be, and the transformation template provides the execution framework so that the command can actually be implemented almost transparently by computing system 300.

For example, a multi-operation sequence may include two commands that are to be executed when the trigger occurs and one condition is met, such as the operation established by the utterance, "Alexa, when I open the front door after 6 pm, turn on the lights in the hall and start playing classic rock music." In that example, the trigger/condition parameters described in the operation template are: (1) was the door opened; and (2) what time is it. The values describes in the instances for those parameters are: (1) yes/no; and (2) 12:01 am—midnight. The transformation template includes instructions that NLU could execute as if NLU had created them to "play classic rock" (i.e., intent is play, slot is classic rock), and to turn on the lights. In that manner, TnS system 220 can hand off "normal" executable commands to computing system 200, which reduces required maintenance of the system, and avoids requiring significant changes to the basic existing framework of executing one off voice-activated commands. For example, the way to get the system to play music hasn't changed, but the initiator of the command to play music might have changed, since the user may end up with the desired music playing by simply saying the utterance "Alexa, I'm going to sleep."

Figure 3C:
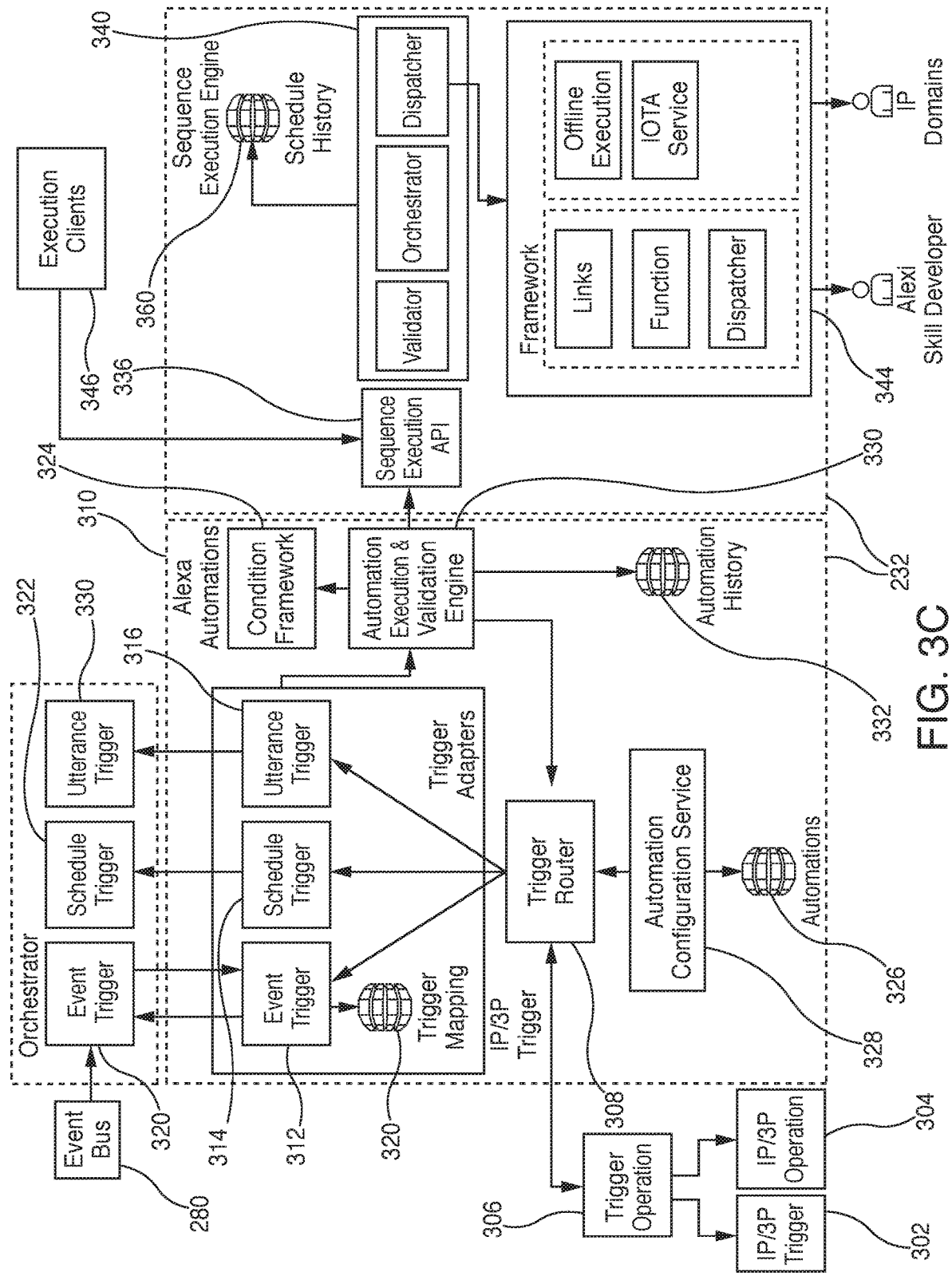
FIG. 3C is an illustrative schematic diagram of the triggers and sequences architecture shown in FIG. 2.

FIG. 3C is an illustrative schematic diagram of an additional level of detail of triggers and sequences system 220, which includes various components that are generally included as part of computing system 200, such as event bus 280 and the orchestrator. In this illustration, TnS management 232 may be generally considered to include Alexa automations module 310 and sequence execution engine 311. Triggers and operations for trigger/operation sequences can be provided to system 220 through trigger providers 302 and operations providers 304 (which are shown to include both first party and third party providers). The inputs from units 302 and 304 are coordinated by trigger/operation catalog API 306, which provides the triggers and operations to automation configuration service 328. Completed automations (which include triggers that have been setup and operations that have been verified) can be stored by service 328 in automations repository 326. In addition, service 328 sends triggers input to the system to trigger router 308, which determines the type of trigger that is being implemented and then routes the trigger to the appropriate service for setup.

Setup of triggers includes formatting the trigger such that NLU 260 would recognize the trigger as a trigger when the trigger appears (such as through an utterance), or when a trigger occurs based on an event or a given schedule. For example, trigger router 306 sends event triggers to event trigger adapter 312, which provides the trigger to trigger mapping 320. Event trigger adapter 312 publishes the trigger through orchestrator trigger module 320 to event bus 280, and subscribes to receive such triggers when they occur through event trigger module 320. Similarly, schedule-based triggers are processed by schedule trigger adapter 314 and schedule trigger module 322, while utterance-based triggers are processed by adapter 316 and module 330 (to event bus 280). Once the trigger has been processed by the appropriate adaptor, the result is sent automation and validation engine 330, which may store the automation in automation history database 332. Any conditions that may be related to the specific trigger/operation sequence can be processed and verified through condition framework 324.

Sequence execution engine 311 includes various components that can execute or cause to be executed the operations that are related to each trigger. At the setup phase, execution engine 311 verifies that the operations that are intended to be executed when a trigger occurs on event bus 280 and is identified by triggers and sequences system 220. Execution clients 346 provides input to sequence execution API 336 to verify operations as they are received from automation, execution and validation engine 330, by passing the operations to validator/orchestrator/dispatcher 240, which provides notification of validated trigger/operation sequences to Alexa skill developers and first party domains through framework 344. Accepted sequences can be stored and indexed in sequence execution engine 360, which can include a schedule history of the sequences.

Figure 3D:
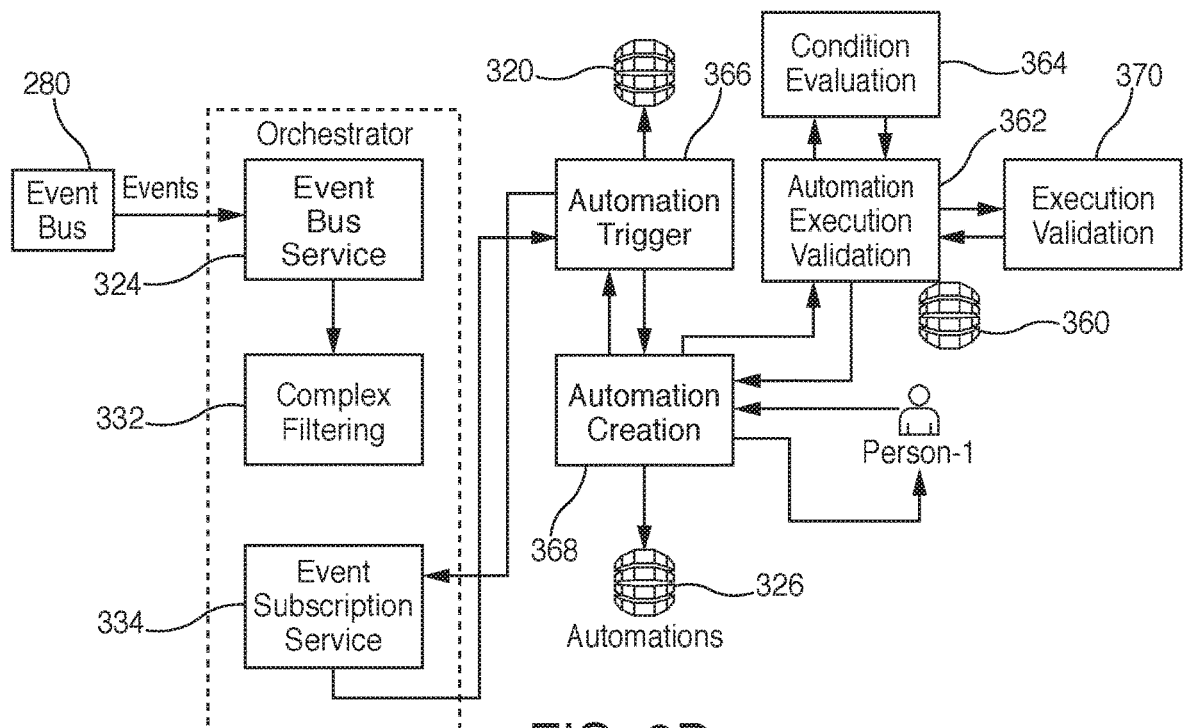
FIG. 3D is an illustrative flow diagram that shows an example of creating automations in accordance with the principles described in various embodiments of the present disclosure.
Figure 3E:
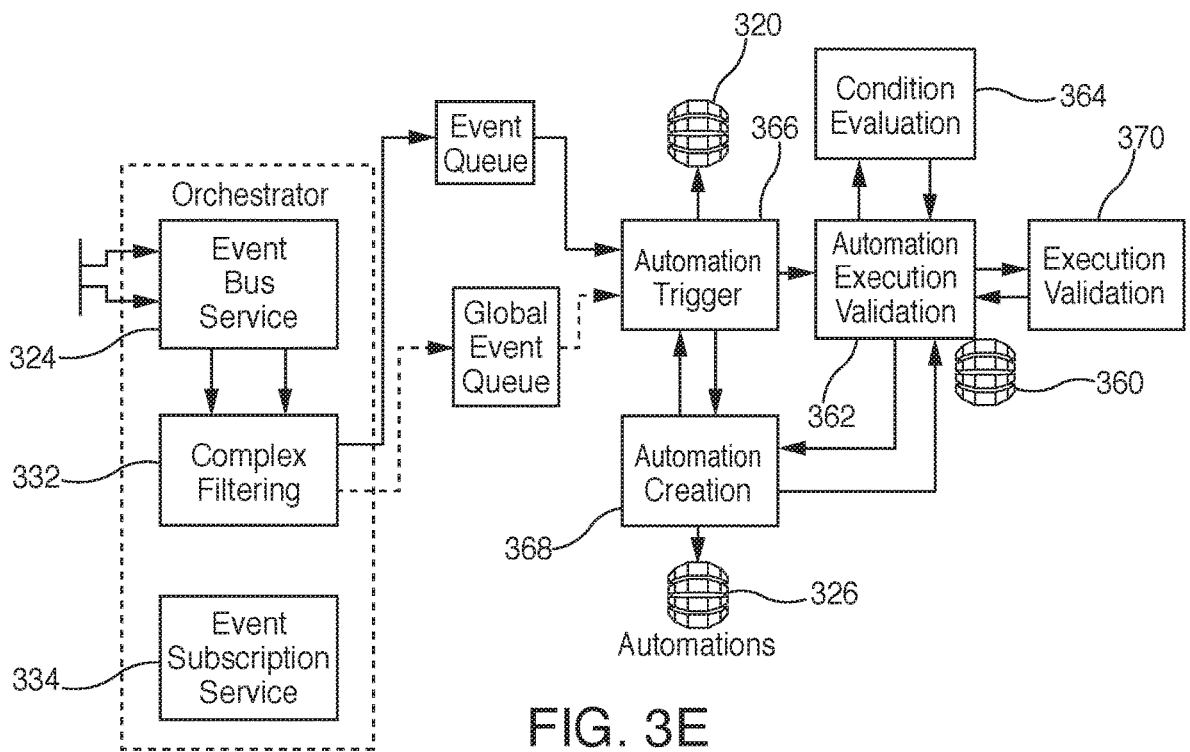
FIG. 3E is an illustrative flow diagram that shows an example of executing automations in accordance with the principles described in various embodiments of the present disclosure.

FIG. 3D is an illustrative flow diagram of sample workflow that may occur when creating trigger/operation sequences. Individual 1 can submit a proposed automation to automation creation module 368. An automation includes a trigger and one or more operations that are to be executed when the trigger is triggered. An automation can also include one or more conditions that must be satisfied in order to the operations to be executed even if the trigger occurs. Conditions, however, are optional features of automations, and therefore, some automations should cause operations to be executed whenever the trigged is triggered. Individual 1 can create a proposed automation using, for example, a standalone companion app (or application) that may be associated with a voice-activated device, such as device 100a. Examples of the process for setting up automations using such a companion app are shown in FIGS. 3F-3N and 3P and described in more detail below (there is no 3O to avoid any confusion with the number 30).

Once the proposed automation is received, automation creation module sends the automation to execution validation engine 362, which in turn sends any conditions associated with the proposed automation to condition validation module 364. If the condition(s) can be validated successfully (e.g., if it can be determined that the condition(s) can be met and that the system can identify that they have been met), a validation notice is sent to validation engine 362. Next, validation engine 362 sends any operations associated with the proposed automation to execution validation module 370 to make sure that the proposed operations are executable, in which case a validation notice is sent to validation engine 362. Once any conditions and all proposed operations have been validated, a validation notice is sent back to automation creation module 368 for processing of the trigger.

Trigger processing is required to automate the proposed trigger, which includes figuring out why type of trigger the proposed trigger is (e.g., event-based, utterance-based, or scheduled-based), and then formatting the trigger as an event that can be published and that can be received and recognized. The process for accomplishing this is that automation creation 368 sends the proposed trigger to automation trigger module 366 for setup. Trigger module 366 determine which type of trigger the proposed trigger is and processes the proposed trigger using the appropriate adapter (e.g., adapters 312, 314, and 316). As additional triggers are developed and accepted, additional adapters may be created and added to the system without departing from the principles described in the present disclosure. Processing the proposed trigger using the appropriate adapter results in a trigger having a format that may be recognized as an event on event bus 280. Automation trigger engine 366 subscribes for the event through event subscription service 334, which responds with a subscription ID associated with the trigger. Once a subscription ID is returned, the automation has been fully verified and the automation can then be is deposited into subscription depository 320 for mapping and indexing. The subscription ID is then returned to automation creation module 368, which returns the subscription ID to individual 1.

FIG. 3E is an illustrative flow diagram of sample workflow that may occur when executing trigger/operation sequences that have been validated and for which automation IDs have been created. Automation execution begins when and event is provided from event bus 280 to event bus service 324. The event is processed by complex filtering 332 to determine the type of event, and in particular, whether the event is a global event or a subscription-based event (i.e., a registered automation). If NLU 260 has identified the event as a subscription-based event having a subscription ID, the event passes through an event queue to automation trigger engine 366, which utilizes the subscription ID to access subscription repository 320 in order to retrieve the association between the subscription ID and the automation ID.

The automation is then sent to automation execution engine 362 (which may be the same engine that controlled validation with respect to the flow described in connection with FIG. 3D). Automation execution engine 362 then sends a request to Automation retrieval engine 368 (again the same engine 368 that created the automation) to get the automation using the automation ID. Automation retrieval engine 368 retrieves the automation using the automation ID from automations repository 326, and returns the automation to automation execution engine 362. Automation execution engine 362 begins to process the automation by evaluating the condition(s) through condition evaluation module 364. Assuming the condition(s) is(are) met, the operations are provided to sequence execution engine 370 for execution, and the execution history is stored in automations database 326.

Figure 3F:
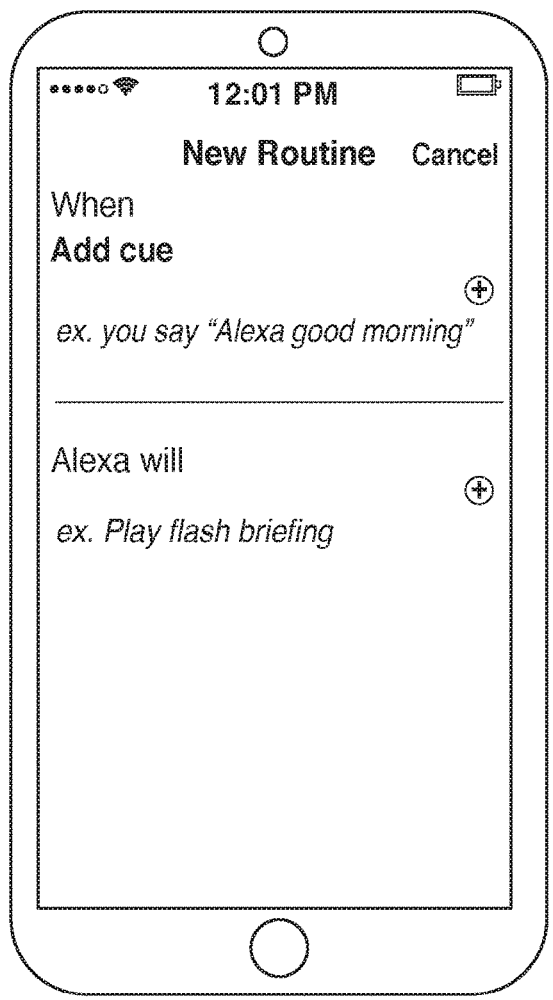
FIGS. 3F-3N and 3P are illustrative diagrams of a stand-alone app that may be utilized in accordance with various embodiments of the principles described in the present disclosure.

FIGS. 3F-3N and 3P illustrate a process of creating automations (which can also be referred to as routines), using a stand-alone companion app running on a device such as smart phone 100b. While voice commands may also be utilized to create automations, the use of a stand-alone companion app enables the individual setting up the routine to be guided through each step in the process, and to have a visual representation of the complete automation displayed for review prior to initiating the creation. FIG. 3F, for example, illustrates an introductory screen that a user might utilize to create a routine. In particular, FIG. 3F illustrates setting up an utterance-based trigger/operation sequence in which the text may state, for example "New Routine," while providing the user with the ability to "Add cue" as the trigger. The user can also add one or more operations that will be executed when the trigger occurs.

Figure 3G:
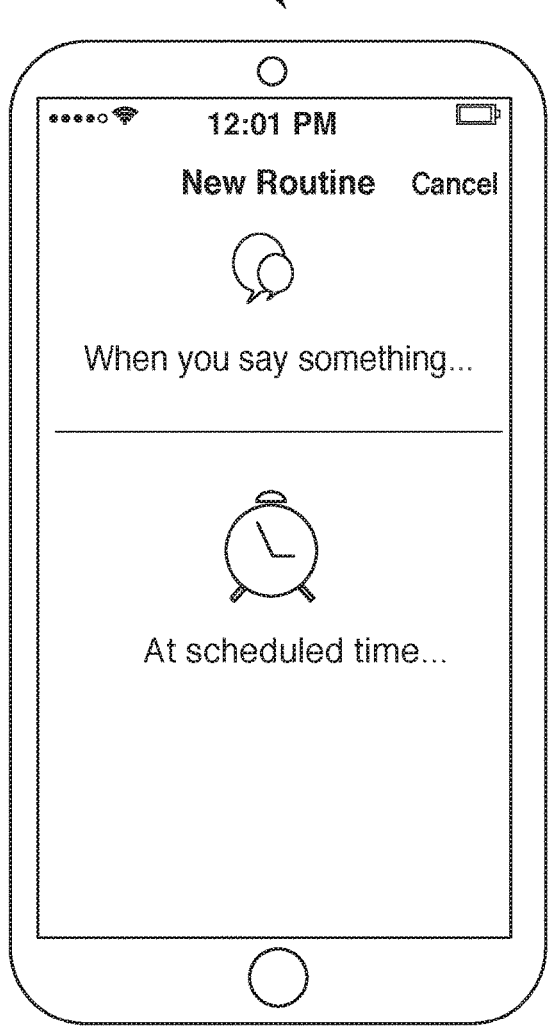
Figure 3H:
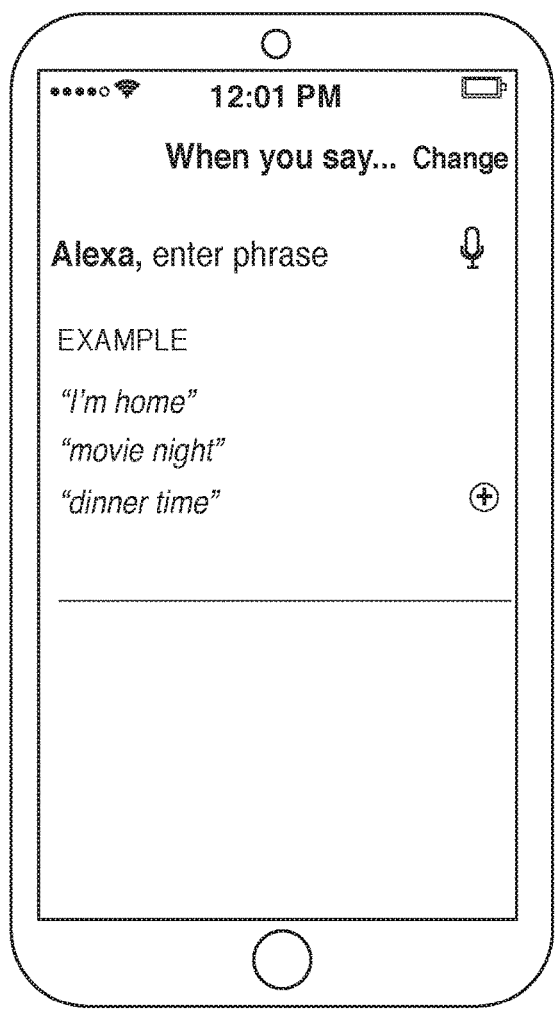
Figure 3I:
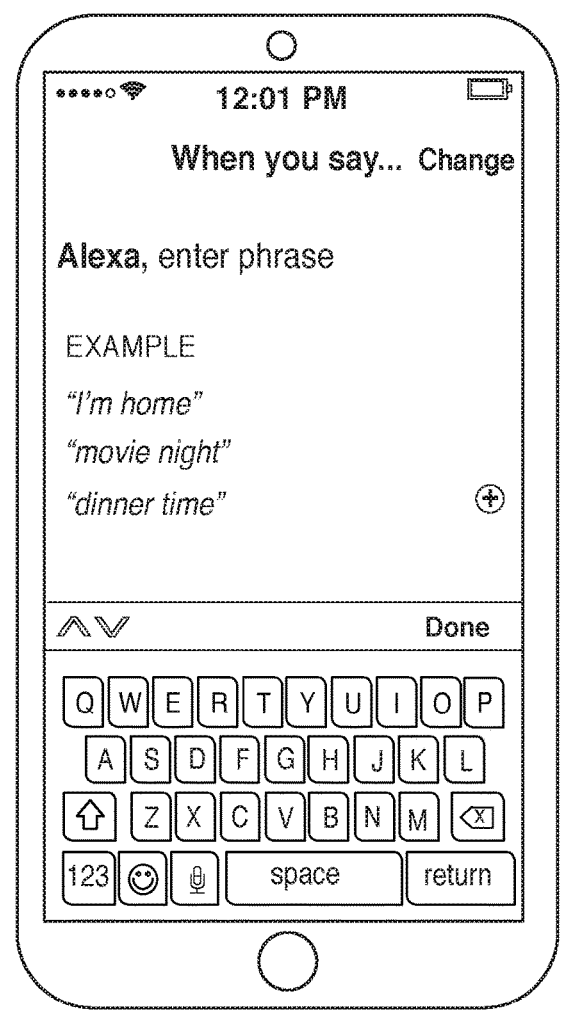

FIG. 3G, also illustrates a process of creating an automation in which the trigger is utterance-based (and thus would be created using adapter 312 instead of adapters 314 or 316). In this instance, however, a condition may also be set related to a scheduled time. Accordingly, even if the trigger is met and the trigger phrase is detected, the execution of the designated operations will not occur until the time-based condition is also met. FIGS. 3H and 3I are illustrations showing how the phrase used for an utterance-based trigger may be altered at the user's discretion. In this manner, the user does not have to delete the previous automation, but instead, may alter it accordingly. In the example shown in FIG. 3H, the individual has selected a screen that enables the individual to change the utterance-trigger phrase. Assuming the user selected the circle/plus sign icon, a keyboard opens up (as shown in FIG. 3I) to permit the user to enter a new trigger phrase.

Figure 3J:
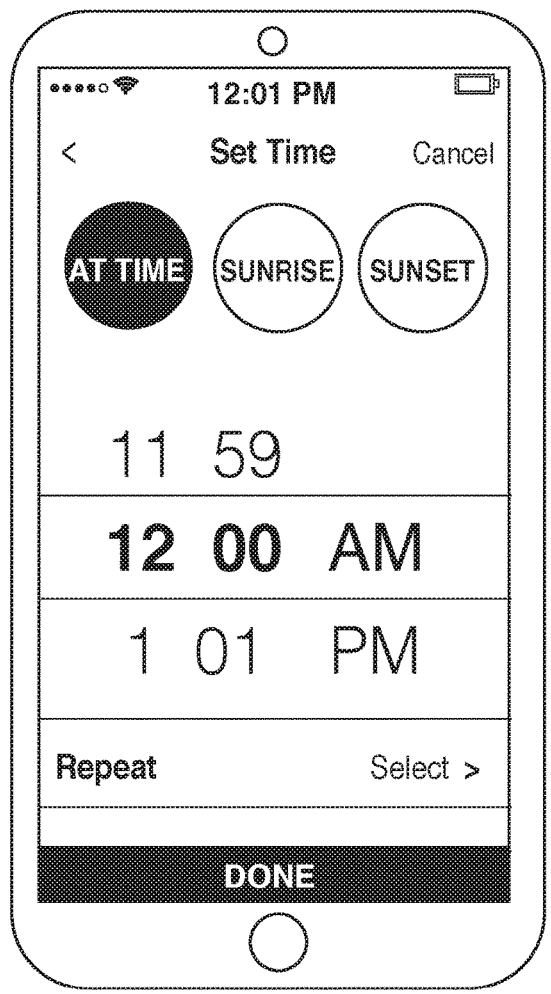
Figure 3K:
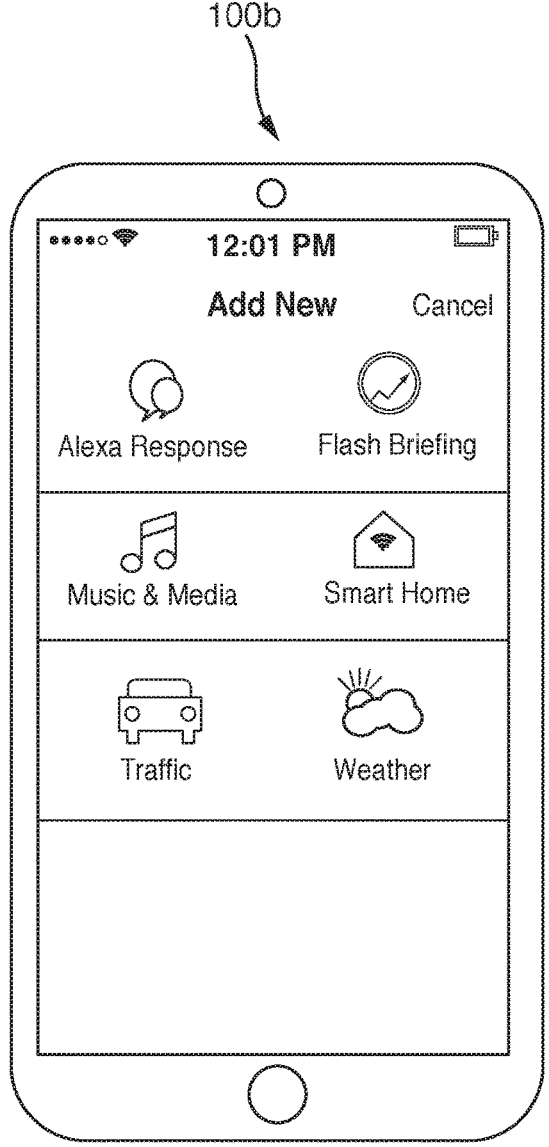

FIG. 3J illustrates the ease with an individual can set a schedule-based trigger (which would require the use of schedule adapter 314 instead of adapters 312 or 316). In this illustration, the individual can select a particular time using the number and AM/PM wheels, or the user can select the trigger to occur at sunrise or at subset by simply selecting the appropriate icon. FIG. 3K illustrates some of the various operations that may be utilized by a customer as part of an automation. In this illustration, six different categories of operations are shown, however, based on the organization and flow shown in connection with FIGS. 3C-3E, it will be understood that additional categories of operations may be designed and added to the system seamlessly. In this example, the individual may choose any number of operations, such as "Alexa Response," "Flash Briefing," "Music and Media," "Smart Home," "Traffic," and "Weather." As previously described, the user may select any number of operations, and the operations need to be limited to a single category.

Figure 3L:
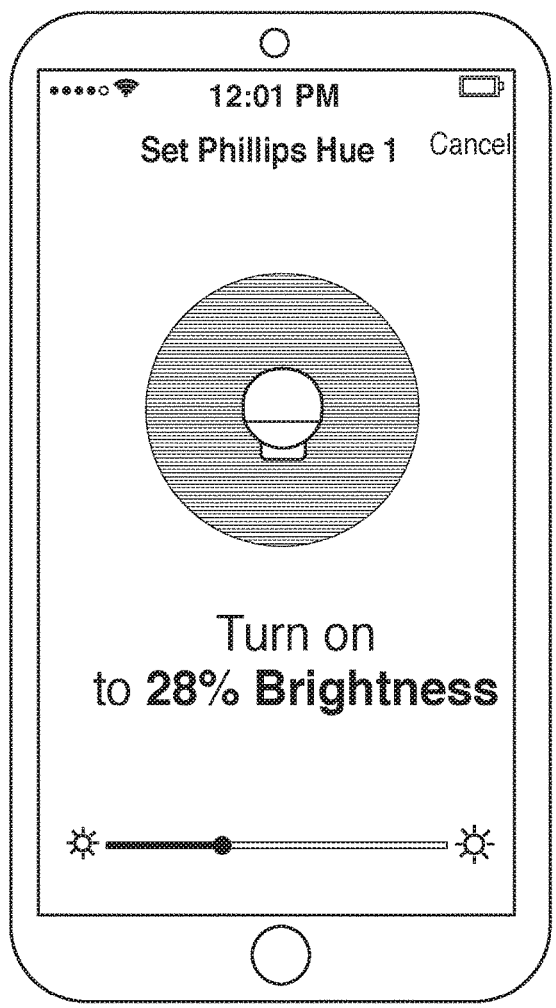
Figure 3M:
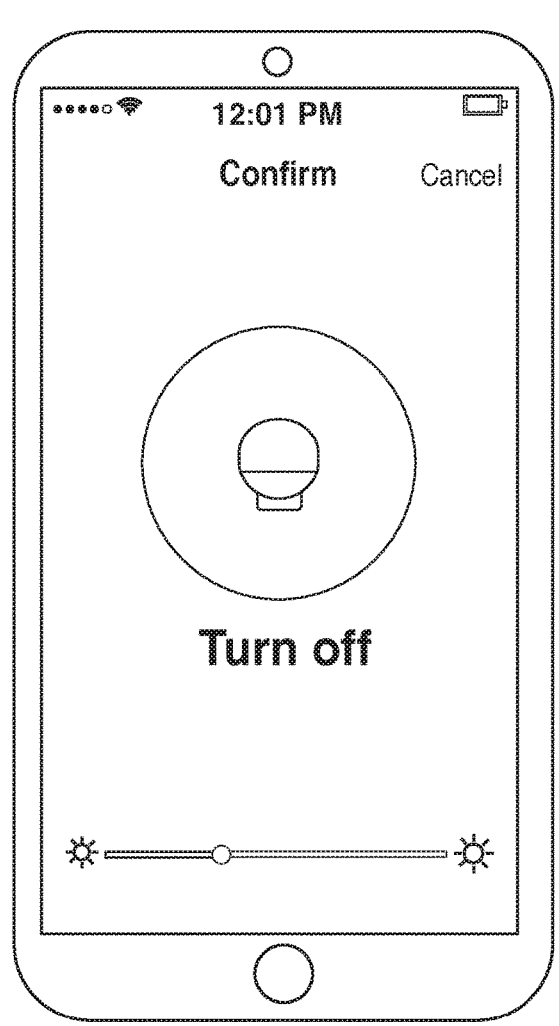

FIG. 3L shows an illustration is which the selected operation is to control one or more lights when a trigger occurs. For example, as shown in FIG. 3L, when the trigger occurs, the Hue light 1 will be turned ON to 28% brightness. In other instances, a user may select one or more colors that should illuminate from the selected light(s). The user may be able to adjust the selected intensity through the slide bar shown below the percentage of illumination, or the user may be able to change the illumination to a specific value by tapping the number and entering a new value. FIG. 3M is similar to FIG. 3L, in that it illustrates a selected operation of controlling a light or light bulb. In this instance, however, the operation is to simply turn the light OFF.

Figure 3N:
Figure 3P:

FIG. 3N illustrates a different operation that may be included in a sequence of operations that are executed when a trigger occurs in an automation. In this instance, when the trigger occurs, the system will begin playing the Flash Briefing for the individual, based on whatever settings and preferences the individual previously selected. For example if a user selected to receive news from NPR and FOX News, and created an utterance-based trigger such as "Alexa, Good morning," the system would begin playing a flash briefing from NPR and FOX News anytime the utterance "Alexa, Good morning" was found on event bus 280. It should be noted that in this instance, the time of day is actually irrelevant because the user created the trigger to be utterance-based. FIG. 3P illustrates an operation where music from a specific playlist on Spotify will be played whenever the trigger associated with the operation in an automation occurs. In the example shown, when the trigger occurs, the system will play the playlist entitled "Summer '17'" from Spotify. The triggers shown and described with respect to FIGS. 3F-3N and 3P are merely illustrative and are not intended to be limiting in any way. Similarly, the operations and/or conditions are also intended to be illustrative and no limiting in any way. Additional triggers, including different kinds of triggers, conditions, and operations may be added to the systems described herein without departing from the principles of the present disclosure.

Figure 4:
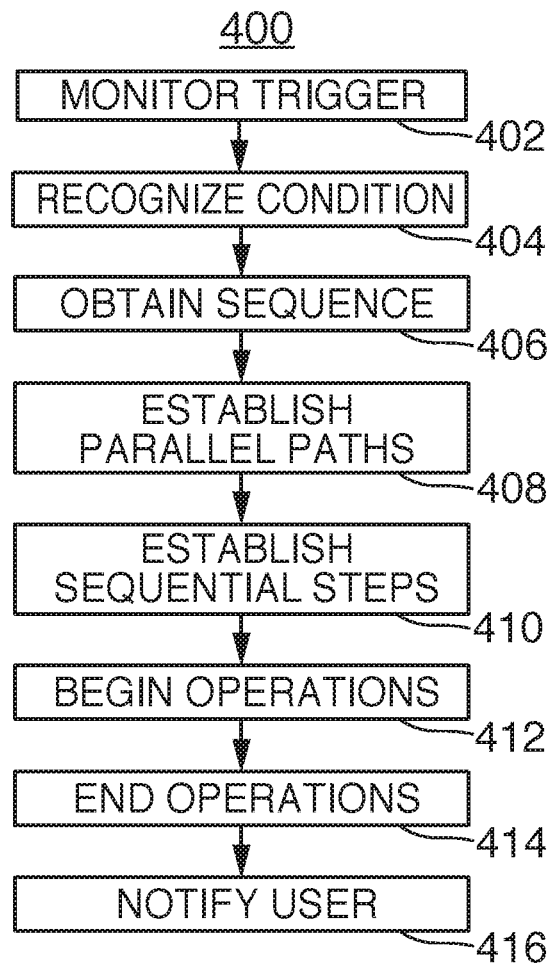
FIG. 4 is an illustrative flow diagram of a process for detecting triggers and executing multi-operation sequences in response to the trigger, in accordance with various embodiments.

FIG. 4 is an illustrative flow diagram of a process 400 for detecting triggers and conditions and executing multi-operation sequences in response to the triggers and conditions, as appropriate, in accordance with various embodiments. Process 400 can begin instep 402 where the occurrence of a trigger can be detected by monitoring for the occurrence of the trigger to happen. For example, if the trigger is based on "when I come home from work," the trigger could be receiving an input from a smart home door lock that the front door was opened, or alternatively, the trigger could be the receipt of an utterance "Alexa, I'm home." In step 404, the system attempts to recognize the occurrence of required condition(s) in order to begin executing the individual commands that make up the multi-operation sequence. For example, the condition may be that it must be after 6 pm, in order to turn on the lights when individual 1 gets home. Accordingly, if individual 1 gets home at 5:30 pm and says "Alexa, I'm home," nothing should happen. In that specific example, however, the user might want the lights to come on and the music to begin playing as soon as it becomes 6 pm, even if the user is already home. Accordingly, the trigger may be satisfied at one point in time, while the condition may not be satisfied until a later time.

At step 406, the beginning of the command execution phase starts by determining the sequence that must be carried out in executing the individual commands that make up the operation. This could include defining any commands that for which completion is necessary prior to other commands beginning execution (for example, if two commands were set up the bowling pins, and roll the bowling ball, completion of the set up step is required before the second ball-rolling step can be executed). In step 408, any parallel paths that can be executed without regard to sequencing are identified. The more parallel the execution of the commands, the more likely there will be enough time to fully execute all of the commands to fulfill the operation within the given system time limitations and inherent latency.

At step 410, any downstream sequential issues are identified and addressed, including any required sequencing that might occur after initial parallel steps have been completed. Steps 408 and 410 can be repeated until a sequential map of all of the commands necessary for completion of the operation are identified. One all sequencing issues have been identified and addressed, execution of the individual commands can begin in step 412. Once all of the commands have been executed, such that the requested multi-operation sequence has been completed, the user may be notified (if the user set that value to that parameter).

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A computer-implemented method comprising:
  during a first time period:
    receiving first input data from a first device;
    determining the first input data corresponds to a trigger to perform a plurality of operations;
    receiving stored data associated with the trigger, the stored data indicating execution of the plurality of operations occurs when a time condition is satisfied;
    determining first time information associated with the first input data; and
    determining the time condition is unsatisfied based at least in part on the first time information; and
  during a second time period after the first time period:
    receiving first data indicating the time condition is satisfied:
    determining the trigger was previously determined; and
    causing the plurality of operations to be executed based at least in part on receiving the first data and determining the trigger was previously determined.

2. The computer-implemented method of claim 1, wherein receiving the first input data comprises receiving audio data corresponding to an utterance, and the computer-implemented method further comprises:
  performing automatic speech recognition (ASR) processing on the audio data to generate ASR output data; and
  performing natural language processing on the ASR output data to determine an intent corresponding to the trigger.

3. The computer-implemented method of claim 1, further comprising:
  receiving the first data from an event bus, the first data representing a present time; and
  determining the present time satisfies the time condition.

4. The computer-implemented method of claim 1, further comprising:
  determining the time condition corresponds to at least one of a first day of week or a first time of day; and
  determining the time condition is unsatisfied based at least in part on determining the first time information corresponds to at least one of a second day of week or a second time of day.

5. The computer-implemented method of claim 1, further comprising:
determining a sequence of execution of the plurality of operations, the sequence indicating that a first operation of the plurality of operations is to be performed before a second operation of the plurality of operations,
wherein causing the plurality of operations to executed comprises causing the first operation to be executed before the second operation.

6. The computer-implemented method of claim 1, wherein causing the plurality of operations to be executed comprises:
generating a command indicating an intent and at least one entity.

7. A computer-implemented method comprising:
during a first time period:
receiving, from a first device, audio data corresponding to an utterance;
performing speech processing on the audio data to determine the utterance corresponds to a trigger to perform a plurality of operations;
receiving stored data associated with the trigger, the stored data indicating execution of the plurality of operations occurs when a time condition is satisfied;
determining first time information associated with the audio data; and
determining the time condition is unsatisfied based at least in part on the first time information; and
during a second time period after the first time period:
receiving first data indicating the time condition is satisfied;
determining the trigger was previously determined; and
causing the plurality of operations to be executed based at least in part on receiving the first data and determining the trigger was previously determined.

8. The computer-implemented method of claim 7, further comprising:
receiving the first data from an event bus, the first data representing a present time; and
determining the present time satisfies the time condition.

9. The computer-implemented method of claim 7, further comprising:
determining the time condition corresponds to at least one of a first day of week or a first time of day; and
determining the time condition is unsatisfied based at least in part on determining the first time information corresponds to at least one of a second day of week or a second time of day.

10. The computer-implemented method of claim 7, wherein performing the speech processing comprises:
performing automatic speech recognition (ASR) processing on the audio data to generate ASR output data; and
performing natural language processing on the ASR output data to determine an intent corresponding to the trigger.

11. The computer-implemented method of claim 7, further comprising:
determining a sequence of execution of the plurality of operations, the sequence indicating that a first operation of the plurality of operations is to be performed before a second operation of the plurality of operations,
wherein causing the plurality of operations to executed comprises causing the first operation to be executed before the second operation.

12. The computer-implemented method of claim 7, wherein causing the plurality of operations to be executed comprises:
generating a command indicating an intent and at least one entity.

13. The computer-implemented method of claim 7, wherein causing the plurality of operations to be executed comprises:
generating a smart home command indicating an intent and at least one entity, the smart home command directing a second device to perform at least a first operation; and
sending the smart home command to an event bus.

14. A system comprising:
memory; and
at least one processor operable to:
during a first time period:
receive, from a first device, audio data corresponding to an utterance;
performing speech processing on the audio data to determine the utterance corresponds to a trigger to perform a plurality of operations;
receive stored data associated with the trigger, the stored data indicating execution of the plurality of operations occurs when a time condition is satisfied;
determine first time information associated with the audio data; and
determine the time condition is unsatisfied based at least in part on the first time information; and
during a second time period after the first time period:
receive first data indicating the time condition is satisfied;
determine the trigger was previous determined; and
cause the plurality of operations to be executed based at least in part on receiving the first data and determining the trigger was previously determined.

15. The system of claim 14, wherein the at least one processor is further operable to:
receive the first data from an event bus, the first data representing, a present time; and
determine the present time satisfies the time condition.

16. The system of claim 14, wherein the at least one processor is further operable to:
determine the time condition corresponds to at least one of a day of week or a time of day; and
determine the time condition is unsatisfied based at least in part on determining the first time information corresponds to at least one of a second day of week or a second time of day.

17. The system of claim 14, wherein the at least one processor is further operable to:
perform automatic speech recognition (ASR) processing on the audio data to generate ASR output data; and
perform natural language processing on the ASR output data to determine an intent corresponding to the trigger.

18. The system of claim 14, wherein the at least one processor is further operable to:
determine a sequence of execution of the plurality of operations, the sequence indicating that a first operation of the plurality of operations is to be performed before a second operation of the plurality of operations; and
cause the first operation to be executed before the second operation.

19. The system of claim 14, wherein the at least one processor is further operable to:
cause the plurality of operations to be executed by generating a command indicating an intent and at least one entity.

20. The system of claim 14, wherein the at least one processor is further operable to:

generate a smart home command indicating an intent and at least one entity, the smart home command directing a second device to perform at least a first operation; and send the smart home command to an event bus.

* * * * *